United States Patent
McDonald et al.

(10) Patent No.: US 9,709,802 B2
(45) Date of Patent: *Jul. 18, 2017

(54) MICROMIRROR APPARATUS AND METHODS

(71) Applicant: TEXAS INSTRUMENTS INCORPORATED, Dallas, TX (US)

(72) Inventors: William C. McDonald, Allen, TX (US); James N. Hall, Parker, TX (US); Mark F. Reed, Sachse, TX (US); Lance W. Barron, Plano, TX (US); Terry A. Bartlett, Dallas, TX (US); Divyanshu Agrawal, Richardson, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/160,157

(22) Filed: May 20, 2016

(65) Prior Publication Data

US 2016/0266377 A1    Sep. 15, 2016

Related U.S. Application Data

(63) Continuation of application No. 14/276,245, filed on May 13, 2014, now Pat. No. 9,348,136.
(Continued)

(51) Int. Cl.
*G02B 26/00* (2006.01)
*G09G 3/34* (2006.01)
(Continued)

(52) U.S. Cl.
CPC ......... *G02B 26/0841* (2013.01); *G09G 3/346* (2013.01); *G02B 5/201* (2013.01);
(Continued)

(58) Field of Classification Search
CPC .............. G02B 26/0833; G02B 26/105; G02B 26/0816; G02B 26/0841; G02B 6/3518;
(Continued)

(56) References Cited

U.S. PATENT DOCUMENTS

| | | |
|---|---|---|
| 5,444,566 A | 8/1995 | Gale et al. |
| 5,629,794 A | 5/1997 | Magel |

(Continued)

*Primary Examiner* — Evelyn A Lester
(74) *Attorney, Agent, or Firm* — Michael A. Davis, Jr.; Charles A. Brill; Frank D. Cimino

(57) ABSTRACT

In described examples, a DMD includes an array of micromirror pixels. Each pixel includes a right electrode on a first side of the pixel, a left electrode on a second side of the pixel adjacent the first side, and a cantilevered beam supporting a mirror. The cantilever beam tilts on two axes of translation: pitch and roll. The mirror has: a first landed position (on a first and second spring tip) over the right electrode; and a second landed position (on the first and a third spring tip) over the left electrode, such that the first landed position and the second landed positions are 90° apart. In transitioning from the first landed position to the second landed position, the mirror maintains contact with the first spring tip while rolling from the second spring tip to the third spring tip.

12 Claims, 20 Drawing Sheets

Related U.S. Application Data

(60) Provisional application No. 61/823,304, filed on May 14, 2013.

(51) Int. Cl.
| | |
|---|---|
| *G02B 26/08* | (2006.01) |
| *G02B 17/00* | (2006.01) |
| *G02B 27/09* | (2006.01) |
| *G02B 26/10* | (2006.01) |
| *G02B 5/20* | (2006.01) |
| *G02B 27/00* | (2006.01) |
| *G02B 6/35* | (2006.01) |

(52) U.S. Cl.
CPC .......... *G02B 6/3518* (2013.01); *G02B 17/006* (2013.01); *G02B 26/00* (2013.01); *G02B 26/0816* (2013.01); *G02B 26/0833* (2013.01); *G02B 26/105* (2013.01); *G02B 27/0068* (2013.01); *G02B 27/0977* (2013.01); *G09G 2340/0492* (2013.01)

(58) Field of Classification Search
CPC .. G02B 27/0977; G02B 5/201; G02B 17/006; G02B 26/00; G02B 27/0068
USPC .... 348/750, 755, 756, 770, 771; 345/55, 85, 345/108; 359/197.1, 198.1, 199.1, 199.2, 359/199.4, 200.6, 200.8, 201.2, 203.1, 359/212.1–214.1, 223.1, 224.1, 224.2, 359/225.1, 226.1, 226.2, 290–292, 295, 359/298, 315–318
See application file for complete search history.

(56) References Cited

U.S. PATENT DOCUMENTS

| | | |
|---|---|---|
| 5,771,116 A | 6/1998 | Miller et al. |
| 6,480,177 B2 | 11/2002 | Doherty et al. |
| 6,906,850 B2 | 6/2005 | Knipe |
| 6,985,278 B2 | 1/2006 | Chu et al. |
| 7,011,415 B2 | 3/2006 | DiCarlo et al. |
| 7,365,898 B2 | 4/2008 | Gong |
| 7,404,909 B2 | 7/2008 | Rothenbury |
| 7,480,089 B2 | 1/2009 | Kmecko |
| 9,348,136 B2 * | 5/2016 | McDonald ......... G02B 26/0841 |
| 2004/0160659 A1 | 8/2004 | DiCarlo |
| 2006/0056007 A1 | 3/2006 | Yamazaki |
| 2007/0064008 A1 | 3/2007 | Childers |
| 2008/0130090 A1 | 6/2008 | Aubuchon |
| 2009/0021884 A1 | 1/2009 | Nakamura |
| 2009/0067025 A1 | 3/2009 | Atnip et al. |
| 2009/0097091 A1 | 4/2009 | Mangrum |
| 2010/0007936 A1 | 1/2010 | Hornbeck |

\* cited by examiner

MICROMIRROR APPARATUS AND METHODS

CROSS-REFERENCE TO RELATED APPLICATIONS

This application is a continuation of U.S. patent application Ser. No. 14/276,245 filed May 13, 2014, which claims the benefit of U.S. Provisional Patent Application No. 61/823,304 filed May 14, 2013. Each of the above-identified applications is hereby fully incorporated herein by reference for all purposes.

BACKGROUND

This relates generally to microelectromechanical system (MEMS) devices and methods of their fabrication and operation, and more particularly to MEMS devices including micromirror arrays.

FIG. 1 illustrates basic components of an image display system utilizing a MEMS device spatial light modulator (SLM) for the projection of images. Light from a light source is directed onto an array of pixel modulator elements whose positions are individually settable in synchronization with image data and with the incident light either to direct light onto an imaging surface through a projection lens (when in the "ON" position) or to block or direct light away from the imaging surface, such as to a light absorber (when in the "OFF" position). For simplicity of illustration, FIG. 1 illustrates an array with just two modulator elements; however, a typical array will have 1000's of such elements arranged in rows and columns, with individual elements having a correspondence with pixel positions of a projected image.

FIGS. 2 and 3 illustrate the structure of a conventional pixel modulator element in the form of a micromirror like that employed in an array of micromirrors in a device such as a Texas Instruments DLP® digital micromirror device (DMD). A DMD is a digitally controlled optical MEMS device. When coupled with a source of illumination and suitable optical system components, the DMD may be used to modulate the amplitude and/or direction of incoming light for creating images or other light patterns. The DMD may be used for light modulation for display of images. Other uses of a DMD include structured light, augmented reality, microscopy, medical instruments, spectroscopy, machine vision, industrial inspection, 3D scanning, 3D optical metrology, automated fingerprint identification, face recognition, interactive display, information overlay, chemical analyzers, photo-stimulation, virtual gauges, and many other applications. The DMD may be used in systems providing image projection as well as in systems providing image capture, or both image projection and image capture. Light sources which may be modulated by a DMD include Xenon lamps, laser light sources, LEDs and phosphor emissions.

A typical DMD includes a micromirror array, a memory array, a data & controller receiver and a micromirror array reset control. The micromirror array typically includes many 100,000's (sometimes 1 million or more) reflective, individually positionable digitally switchable, micrometer-sized mirrors organized in a two dimensional n column×m row or other systematically arranged array. The array may have a rectangular Manhattan-type pixel configuration with rectangular mirror elements having edges aligned with sides of the array rectangle as shown in FIGS. 4 and 5, or may have a diamond pixel configuration with diagonals aligned with sides of the array rectangle as shown in FIGS. 6 and 7. In the Manhattan-type configuration, the columns of each odd row are in pixel-to-pixel column alignment with the columns of each adjacent even row. In the diamond pixel configuration, the columns of each odd row are offset by half a pixel from the columns of the adjacent even row.

Conventional micromirrors may be aluminum elements approximately 5-10 microns in size (e.g., 7.6 micron pitch) and switchable between discrete angular positions of +12 deg. ("ON" state) to −12 deg. ("OFF" state) relative to a 0 deg. flat reference state when mirrors are parked in an inactive state, parallel to the plane of the array (see FIGS. 5 and 7). The parked position is not a latched position. The individual micromirror angular positions are relatively flat, but will vary. The tilt direction is perpendicular to the hinge-axis. The "ON"-state position is directed toward one side of the package, the "OFF"-state position is directed to the other side of the package.

The memory array is typically a two-dimensional array of 1-bit CMOS memory cells, organized in a grid of n memory cell columns× m memory cell rows. The memory array is addressed on a column-by-column basis, over a double data rate (DDR) bus. The DMD is typically used in conjunction with a digital controller chip. Each individual micromirror is positioned over a corresponding CMOS memory cell. The angular position of a particular mirror is determined by the binary state (logic 0 or 1) of the corresponding CMOS memory cell contents after the mirror clocking pulse is applied. The angular position (+12 deg. or −12 deg.) of the individual mirror changes synchronously with the micromirror clocking pulse, rather than being coincident with the memory cell data update. Thus, writing a logic 1 into a memory cell followed by a mirror clocking pulse results in the corresponding mirror switching to a +12 deg. ("ON"-state) position, and writing a logic 0 into a memory cell following by a mirror clocking pulse results in the corresponding mirror switching to a −12 deg. ("OFF"-state) position. Updating the angular position of the mirror array is done in two steps. First, updating the contents of the memory. Second, application of a mirror reset to all or a portion of the mirror array (depending on the configuration of the system). Mirror reset pulses are generated internally by the DMD chip, with the application of the pulses being coordinated by the controller.

The conventional DMD micromirror pixel modulator element is an electro-mechanical element that operates with two stable mirror states (+12 deg. and −12 deg. for current DMDs) that are determined by electrostatics of the pixel during operation. Which of the two positions the mirror is placed in determines the direction that light incident on the array is deflected. By convention, the positive (+) state is tilted toward the illumination and is referred to as the "ON" state, and the negative (−) state is tilted away from the illumination and is referred to as the "OFF" state. FIG. 5 shows a pixel in the "ON" and "OFF" states for an array having micromirrors arranged in a Manhattan-type configuration. FIG. 7 shows a pixel in the "ON" and "Off" states for an array having micromirrors arranged in a diamond-type configuration. In each case, the mirror in the "ON"-state position directs light incident from the illumination light path toward the projected light path (viz., toward the projection lens in the display system of FIG. 1), and the mirror in the "OFF"-state position directs the light incident from the illumination light path toward the off-state light path (viz., toward the light absorber in FIG. 1).

In the conventional Manhattan-type configuration illustrated in FIGS. 4 and 5, incident illumination is directed diagonally relative to the array (from upper left to lower right in the example given in FIGS. 4 and 5). The mirrors are generally rectangular elements arranged to tilt about a hinge axis extending at 45 deg., diagonally of the mirror and perpendicular to the direction of incident illumination. In the conventional diamond-type configuration illustrated in FIGS. 6 and 7, incident illumination is directed parallel to one of the rows and columns relative to the array (from left to right parallel with the offset rows in the example given in FIGS. 6 and 7). The mirrors are generally rectangular elements arranged to tilt about a hinge axis extending parallel to the other of the rows and columns and perpendicular to the direction of incident illumination.

A side-by-side comparison of the diamond and Manhattan arrangement is illustrated in FIG. 8. As is apparent from the comparison, the diamond arrangement utilizes micromirror pixels similar to those of the Manhattan arrangement, except rotated 45 deg.

Mechanically, the pixel includes a mirror attached by means of a via support to a hidden yoke and a torsional hinge as shown in FIGS. 2 and 3. The yoke makes contact with the surface below on the spring tips. FIG. 2 shows a mirror in each of the two stable states. The electrodes shown are used in electrostatically holding the mirror in these positions. Below each mirror is a memory cell formed from Dual CMOS memory elements as depicted in FIG. 3.

The state of the two memory elements of the memory cell are not independent, but are always opposite. If one element is 1 the other element is 0, and vice versa. The state of the pixel memory cell plays a part in the mechanical position of the mirror; however, loading the memory cell does not automatically change the mechanical state of the mirror. Although the state of the dual CMOS cell plays a part in determining the state of the mirror, it is not the sole factor. Once the mirror has landed changing the state of the memory cells will not cause the mirror to flip to the other state. Therefore, memory state and mirror state are not directly linked together.

In order for the state of the CMOS memory to be transferred to the mechanical position of the mirror, the pixel must undergo a "Reset". This Reset momentarily releases the mirror and then re-lands the mirror based on the state of the CMOS memory below. For this reason, data sheets typically specify a period of time prior to Reset during which the memory cell should not be loaded, and also specify a period of time after a Reset has occurred before new data is to be loaded. A Reset allows groups of pixels to be pre-loaded and then change their mechanical position simultaneously.

Examples of conventional MEMS devices employing micromirrors are described in U.S. Pat. Nos. 7,011,415 and 7,404,909 and in US Patent Pub. No. US 2009/0067025, the entireties of all of which are incorporated herein by reference.

The dimensions of the DMD array are determined by the resolution of the particular DMD. For example, a DMD with an XGA resolution may have pixels configured in an array of 1024 columns×768 rows. For the purpose of resetting and block clearing, the DMD may be divided into blocks. For example, XGA devices are typically divided into 16 blocks of 48 rows each. DMD memory is typically loaded by row, with an entire row loaded even if only one pixel in the row needs to be changed.

The DMD is typically fabricated as a MEMS component containing an array of aluminum micromirrors atop a CMOS substrate that digitally switch in a binary state. A typical configuration includes a uniform band of border micromirrors (referred to as a "pond") around the perimeter of a central core of active micromirrors in the array. These border micromirrors are not user-addressable but are tilted into the −12 deg. ("OFF") position once power has been applied to the device. An example known implementation has 10 border mirrors on each side of a 912×1140 active mirror array. The border mirrors serve the purpose of directing stray incident light out of the field of view of the projected light path.

Optimal, long-term performance of a DMD device can be affected by various application parameters, including illumination spectrum, illumination power density, micromirror landed duty-cycle, ambient temperature (storage and operating), case temperature, ambient humidity (storage and operating), and power on/off duty cycle. "Landed duty-cycle" refers to the percentage of time an individual micromirror spends landed in one state (+12° or) −12° versus the other state (−12° or +12°). It does not account for the effect of micromirror switching duty cycle, which is application dependant. Micromirror switching duty cycle represents the percentage of time that the micromirror is actually reflecting light from the optical illumination path to the optical projection path. This duty cycle depends on the illumination aperture size, the projection aperture size, and the micromirror array update rate.

Processing of the digital input image and conversion of the data into a format usable by the DMD is performed by the controller. The DMD steers light by using binary pulse-width modulation (PWM) for each micromirror. In a typical application 24-bit RGB data is received at a display device at 120 Hz frame rate. This frame rate is composed of three colors (red, green, blue), with each color equally divided in the 120 Hz frame rate. Thus, each color has a 2.78 ms time slot allocated for display within the available frame display time. Because each color has an 8-, 9-, or 10-bit depth, each color time slot is further divided into bit-planes. A bit-plane is the two-dimensional (2D) arrangement of 1-bit data extracted from all the pixels in the full color 2D image to implement dynamic depth. The length of each bit-plane in the time slot is weighted by a corresponding power of two of its binary representation. This provides a binary pulse-width modulation of the image. For example, a 24-bit RGB input has three colors with 8-bit depth each. Each color time slot is divided into eight bit-planes, with the sum of the weight of all bit planes in the time slot equal to 256. Therefore, a single video frame is composed of a series of bit-planes as illustrated in FIG. 9. Because the DMD mirrors can be either "ON" or "OFF" depending on their tilt angle settings, an image is created by turning "ON" the mirrors corresponding to the bits set to logic 1 in a bit-plane and "OFF" the mirrors corresponding to the bits set to logic 0 in that bit-plane. With binary pulse-width modulation, the intensity level of the color at a particular image pixel location is reproduced by controlling the amount of time the mirror is "ON" for that pixel. For a 24-bit RGB frame image inputted to a typical DMD array controller chip such as a Texas Instruments DLPC350, for example, 24 bit planes are created and stored in a double-buffered eDRAM embedded in the chip, which sends them to the DLP4500 DMD device, for example, one bit-plane at a time. Depending on the bit weight of the bit-plane, the DLPC350 controls the time this bit-plane is illuminated, controlling the intensity of the bit-plane.

FIG. 10 illustrates the weighted illumination times for the bit-planes in a pulse-width modulation scheme employing simple binary weighting. To improve image quality in video frames, these bit-planes, time slots, and color frames are typically shuffled and interleaved with spatial-temporal algorithms by the controller chip to avoid undesirable motion artifacts and other similar anomalies. For applications where video enhancement is not desired, the video processing algorithms can be bypassed and replaced with specific sets of bit-planes. The bit-depth of the pattern is then allocated into the corresponding time slots. Furthermore, an output trigger signal is also synchronized with these time slots to indicate when the image is displayed. For structured light applications, this mechanism provides the capability to display a set of patterns and signal a camera to capture these patterns overlaid on an object. US Patent Pub. No. 2007/0064008, incorporated herein by reference, includes a description of example schemes for division of an image frame display period into weighted time slices to display an image using incident light pulse-width modulation to control pixel color and intensity.

A functional block diagram of the Texas Instruments DLPC350 chip is shown in FIG. 11. The DLP350 chip stores two 24-bit frames in its internal memory buffer. This 48 bit-plane display buffer allows the DLPC350 to send one 24-bit buffer to the DMD array while the second buffer is filled from flash memory or streamed in through the 24-bit RGB interface. In streaming mode, the DMD array displays the previous 24-bit frame while the current frame fills the second 24-bit frame of the display buffer. Once a 24-bit frame is displayed, the buffer rotates, accessing the next 24-bit frame to the DMD. Thus, the displayed image is a 24-bit frame behind the data streamed through the 24-bit RGB parallel interface. In structured light mode, the 48 bit-planes can be pre-loaded from flash memory and then sequenced with a combination of patterns with different bit depths.

The Texas Instruments DLP5500 DMD is an example of a digitally controlled MEMS spatial light modulator (SLM) that, when coupled to an appropriate optical system, can be used to modulate the amplitude, direction, and or phase of incoming (illumination) light. Architecturally, the DLP5500 is a latchable, electrical-in, optical-out semiconductor device (micro electro-optical-mechanical system or MEOMS). The DLP5500 is one of three components in the Texas Instruments DLP 0.55 XGA chip-set. Other components of the chip-set are the Texas Instruments DLPC200 and DLPA200 which control and coordinate the data loading and micromirror switching. Electrically, the DLP5500 has a two-dimensional array of 1-bit CMOS memory cells, organized in a square grid of 1024 memory cell columns by 768 memory cell rows. The CMOS memory array is written to on a column-by-column basis, over a 16-bit Low Voltage Differential Signaling (LVDS) double data rate (DDR) bus. The micromirror array is organized in a Manhattan-type two-dimensional array of 1024 micromirror columns by 768 micromirror rows, each mirror having an associated respective memory cell. The mirrors are aluminum reflective elements of approximately 10.8 microns in size, tiltable about a hinge axis for switching between two discrete angular positions: −12 deg. and +12 deg. The angular positions are measured relative to a 0 deg. "flat state", which is parallel to the array plane. The tilt direction is perpendicular to the hinge-axis which is positioned diagonally relative to the overall array. The "ON"-state landed position is directed towards the "Row 0, Column 0" corner of the device package (upper left corner in FIGS. 4 and 5). The "OFF"-state landed position is directed towards the "Row 767, Column 1023" corner of the device package (lower right corner in FIGS. 4 and 5). In the field of visual displays, the 1024 by 768 "pixel" resolution is referred to as "XGA".

Each individual micromirror is positioned over a corresponding CMOS memory cell. The angular position of a specific micromirror is determined by the binary state (logic 0 or 1) of the corresponding CMOS memory cell contents, after the mirror "clocking pulse" is applied. The angular position (−12 deg. or +12 deg.) of the individual micromirrors changes synchronously with a micromirror "clocking pulse", rather than being synchronous with the CMOS memory cell data update. Therefore, writing a logic 1 into a memory cell followed by a mirror reset will result in the corresponding micromirror switching to a +12 deg. position. Writing a logic 0 into a memory cell followed by a mirror reset will result in the corresponding micromirror switching to a −12 deg. position. Operationally, updating the angular position of the micromirror array includes first updating the contents of the CMOS memory, followed by application of a mirror "Reset" to all or a portion of the micromirror array (depending upon the configuration of the system). Mirror Reset pulses are generated by the DLPA200, with application of the pulses being coordinated by the DLPC200 controller. Around the perimeter of the 1024 by 768 array of micromirrors is a uniform band of "border" micromirrors. The border micromirrors are not user-addressable. The border micromirrors land in the −12 deg. position once power has been applied to the device. There are 10 border micromirrors on each side of the 1024 by 768 active array.

FIG. 12 shows a top view of a Texas Instruments DLP® DMD having a 1024 column×768 row array of micromirrors in a Manhattan-type arrangement. Each individual mirror and underlying structure corresponds to one image forming pixel (picture element) for modulating incident light for imaging color and intensity of a corresponding pixel of a displayed image. FIG. 12 also illustrates a cross-section taken along the diagonal hinge axis showing the construction of the pixel element. The MEMS mirrors at each pixel position are formed as a superstructure over a silicon chip which has been processed using CMOS processing steps to form the memory array. The CMOS circuitry includes transistors (doped silicon), contacts and interconnects (patterned Metal 1, Metal 2 layers). Contacts to the underlying CMOS circuitry ("Via 2 Contact to CMOS"), metal address pads, and bias/reset bus elements (see FIG. 3) are formed through deposition and patterning of a conductive layer (one or more layers of metal; Metal 3). A first sacrificial layer (e.g., photoresist) is formed and patterned over the patterned conductive layer. The pattern includes via openings. A layer of hinge forming material (one or more layers of metal; Metal 4) is formed over the patterned first sacrificial layer, and patterned to form a torsion hinge (spring) with spring tip extensions and raised address electrodes (FIG. 3). The hinge forming material extends conformally into the via openings to define supports for the hinge ("SP1 Via" in FIG. 3) and for the raised electrodes. A second sacrificial layer (e.g., also photoresist) is formed and patterned over the patterned hinge forming layer. The pattern includes a central via opening. A layer of mirror forming material (one or more layers of metal; Metal 5) is formed over the patterned second sacrificial layer, and patterned to form a reflective element (rectangular-shaped mirror). The mirror forming material extends into the via opening to define a support for the mirror ("Mirror Via" in FIG. 3). To provide flatness, the second sacrificial layer is planarized prior to deposition of the mirror forming material. The first and second sacrificial layers provide support to the hinge and mirror forming layers during fabrication and are subsequently removed (viz., dry etched) to release ("free") the hinge and mirror following formation.

FIGS. 13-15 illustrate the assembled and released pixel structure of FIG. 3, with the mirror tilted to a 12 deg. tilt angle after setting in consequence of a Reset signal to the "ON" (+12 deg.) or "OFF" (−12 deg.) position in accordance with the logic 1 or logic 0 state previously stored in the underlying CMOS memory cell. Setting the position of each mirror occurs electrostatically. The output of the memory cell (logic 1 or logic 0, corresponding to the bit-plane bit for that pixel position) and its complement control the opposite potentials applied to mirror electrodes located below the mirror on respective sides of the hinge axis. When an appropriate bias/reset potential is applied to the mirror (or mirror/yoke assembly), the mirror tilts about its hinge axis in attraction to the electrode with the greatest potential difference relative to the bias/reset potential. The mirror lands on the spring tips closest to that electrode, preventing contact of the mirror with the electrode and pre-loading the mirror for release under stored energy of spring action. When the bias is removed (allowed to float or set to 0 volts), the mirror returns to a flat state.

A simplified rendition of the logic state loading and position reset operation is illustrated schematically in FIG. 16. Setting the mirror position involves the application of three voltage signals to the pixel: a mirror bias/reset voltage (MBRST), an address voltage Φa, and an address complement voltage $\overline{\Phi a}$. In a typical implementation, the memory cell may be a 5T SRAM memory cell which provides two address nodes: Address Φa (0/3.3 V) and Complement $\overline{\Phi a}$ (3.3/0V). The voltages from the address nodes are applied to the raised address electrodes (formed at the hinge level) through the metal address pads (formed at the Metal 3 level) by via contacts ("Via 2 Contact to CMOS") to the underlying CMOS memory cell structure (see FIGS. 3, 13 and 14). The bias/reset voltage is applied via routing for the pixels of the same common reset block of mirrors on the Metal 2 and Metal 3 layers, to the bias/reset bus elements (see FIGS. 3, 13 and 14), to the hinge through the hinge support vias ("SP1 Vias"), and to the mirror main structure through the mirror support via ("SP2 Via" in FIG. 14).

FIG. 16 shows the mirror in an initial flat-state or parked position, with the mirror bias/reset voltage (MBRST) set to 0 volts. With 0 volts MBRST applied as shown, the logic 0 is applied to the memory cell, which applies an address voltage (Address Φa) of 0 volts to one address electrode and an address complement voltage (Complement $\overline{\Phi a}$) of 3.3 volts to the other address electrode. The bias/reset voltage is then raised to 26 volts, which tilts the mirror about the diagonal hinge axis, away from the address electrode to which the address complement voltage (3.3 volts) is applied and toward the address electrode to which the address voltage (0 volts) is applied. This sets the mirror into a −12 deg. "OFF"-state tilt position as shown in the rightmost, middle view in FIG. 16.

To shift the mirror into the other +12 deg. "ON"-state position involves a similar operation. The logic 1 is applied to the memory cell, which applies an address voltage (Address Φa) of 3.3 volts to the one address electrode and an address complement voltage (Complement $\overline{\Phi a}$) of 0 volts to the other address electrode. The increase from 0 volts to 3.3 volts of the one address electrode and decrease from 3.3 volts to 0 volts of the other address electrode does not affect the potential difference (relative to the 26 volt mirror voltage) significantly enough to move the mirror out of its tilted position, so the mirror remains in its "OFF"-state position for the updated loading of the memory cell and until the application of a Reset pulse to the mirror through the bias/reset bus. When this occurs, the mirror is released to move through the flat-state position into the +12 deg. "ON"-state tilt position as shown in the rightmost, bottom view in FIG. 16.

An example Reset pulse may involve increasing the mirror bias voltage (above 26 volts) for an initial period, then removing the bias voltage for a short period (going to 0 volts or floating the mirror), and then reapplying the bias voltage (26 volts). The initial increase in bias voltage increases the electrostatic attraction between the adjacent address electrode (left electrode in FIG. 16; now at 3.3 volts) and the mirror (now at greater than 26 volts), causing the mirror to be attracted even more toward the adjacent electrode. This greater attraction deforms the spring tips and may also deform the torsion hinge (and hinge yoke, if present) so that, when the Reset pulse is removed, the energy stored by the deformation is released and the mirror springs away from the adjacent electrode (left electrode in FIG. 16; now at 3.3 volts) toward the flat-state position (initial 0 volt position discussed previously). This enables the released mirror to transition from tilting toward the one electrode to tilting nearer to the other electrode on the opposite side of the torsion hinge. After the mirror is repositioned nearer to the other electrode, the bias voltage (26 volts in this example) is reapplied and the mirror is attracted to the other electrode (right electrode in FIG. 16; now at 0 volts) as shown in the rightmost bottom view in FIG. 16.

Additional details and variations regarding the application of voltages to set mirror tilt positions are given in U.S. Pat. Nos. 5,444,566; 5,771,116; 6,480,177; 6,906,850; 6,985,278; and references cited therein; the entireties of all of which are incorporated by reference herein.

SUMMARY

In described examples, a DMD includes an array of micromirror pixels. Each pixel includes a right electrode on a first side of the pixel, a left electrode on a second side of the pixel adjacent the first side, and a cantilevered beam supporting a mirror. The cantilever beam tilts on two axes of translation: pitch and roll. The mirror has: a first landed position (on a first and second spring tip) over the right electrode; and a second landed position (on the first and a third spring tip) over the left electrode, such that the first landed position and the second landed positions are 90° apart. In transitioning from the first landed position to the second landed position, the mirror maintains contact with the first spring tip while rolling from the second spring tip to the third spring tip.

DETAILED DESCRIPTION OF EXAMPLE EMBODIMENTS

Example embodiments include a micromirror architecture for a micromirror array of a digital micromirror device (DMD) spatial light modulator (SLM). Also, example embodiments include methods for tilting micromirrors as enabled using the new architecture, and chips and display systems employing principles embodied in the new architecture.

A disclosed example implementation provides a micromirror with a cantilevered flexure beam that allows rotation about two axes (perpendicular and parallel to beam length). The disclosed example further provides a micromirror with two-axis rotation angles (pitch and roll) that allow a higher composite tilt angle. The disclosed example provides a micromirror that has two stable landed states that are 90° apart (rather than 180° as in dome). The disclosed micromirror has three spring tip contact points, where two are in contact at a time, and only one contact point must be broken to allow a transition from one state to another (viz., transition between "ON" and "OFF" states).

Advantages of the new architecture include higher (viz. 17°) tilt angle, added (viz., ~100%) brightness gain (vs. 12° tilt angle prior Manhattan array micromirrors), and enablement of more compact system arrangements.

An example embodiment takes the form of tripoint (TRP) micromirror design with cantilevered flex beam allowing dual-axis mechanical motion and 90-degree switching angles. The example embodiment is shown in FIGS. 17-22.

The new design provides distinctions over current micromirror architectures. A higher landed tilt angle (16+ degrees) is provided without a corresponding penalty to hinge dimensions and dynamic (i.e., stiction) performance. The new design supports a side-illuminated Manhattan mirror arrangement (without unacceptable degradation to optical contrast). In a side-illuminated Manhattan array, the rotation along two axes avoids contrast loss problems caused with a standard torsion hinge architecture by diffraction from the edge of mirror that is perpendicular to the light source. A high tilt design using the standard "FTP" architecture results in reduced dynamic stiction margin. The TRP architecture at 17-degree composite tilt angle has a dynamic stiction margin equivalent to a 12-degree FTP design.

As shown in FIGS. 17-22, a micromirror structure 100 at each pixel position is formed as a MEMS superstructure 102 over a silicon chip 104 which has been processed using CMOS processing steps to form a memory element below the micromirror structure at each pixel location. The CMOS circuitry includes transistors (doped silicon), contacts and interconnects (patterned Metal 1, Metal 2 layers).

Figure 1:
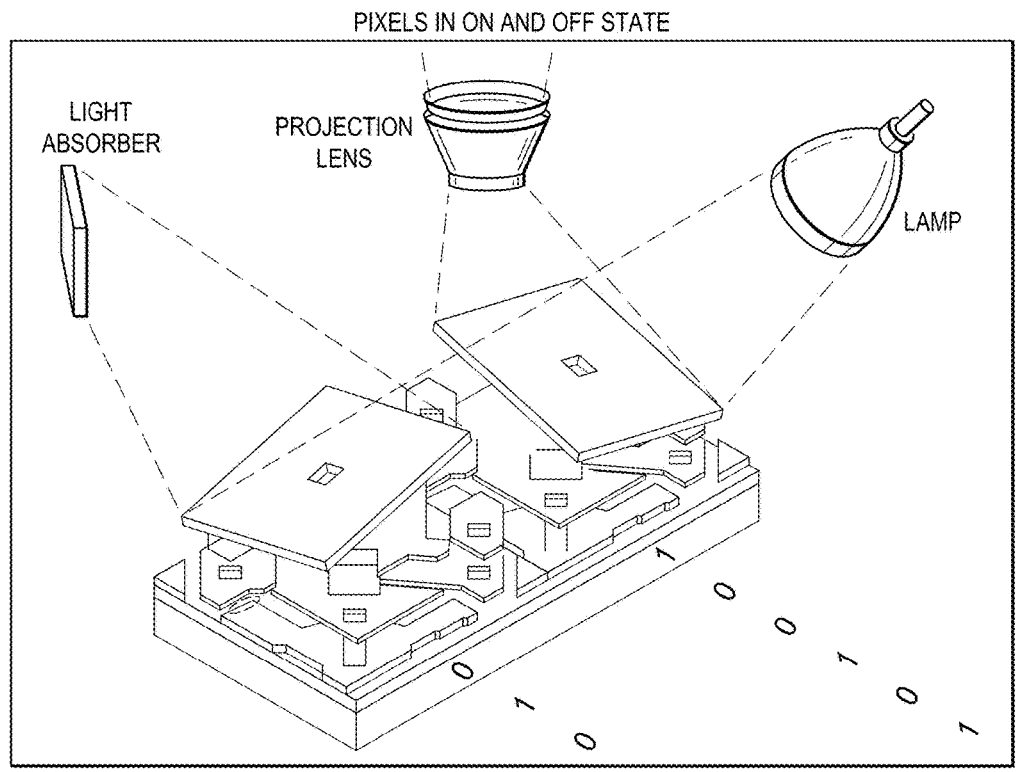
FIG. 1 illustrates basic components of an image display system utilizing a MEMS device spatial light modulator (SLM) for the projection of images.
Figure 2:
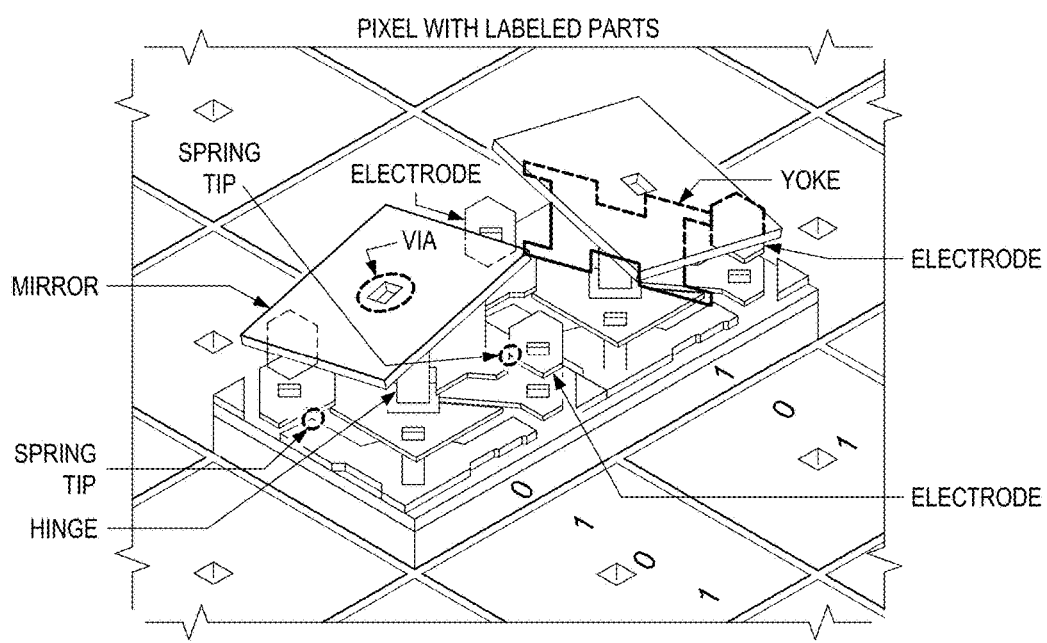
FIGS. 2 and 3 illustrate the structure of a conventional pixel modulator element in the form of a micromirror.
Figure 3:
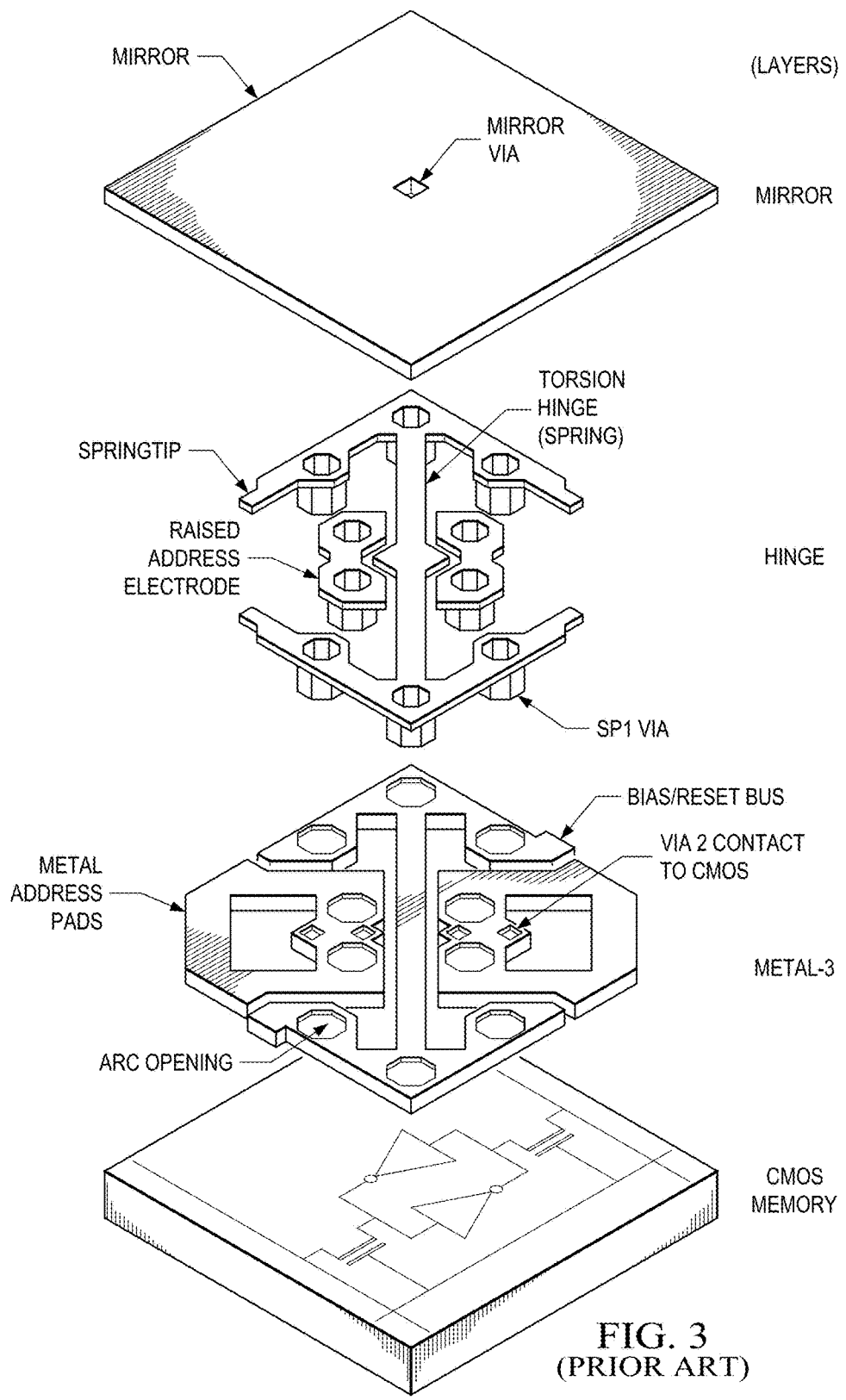
Figure 4:
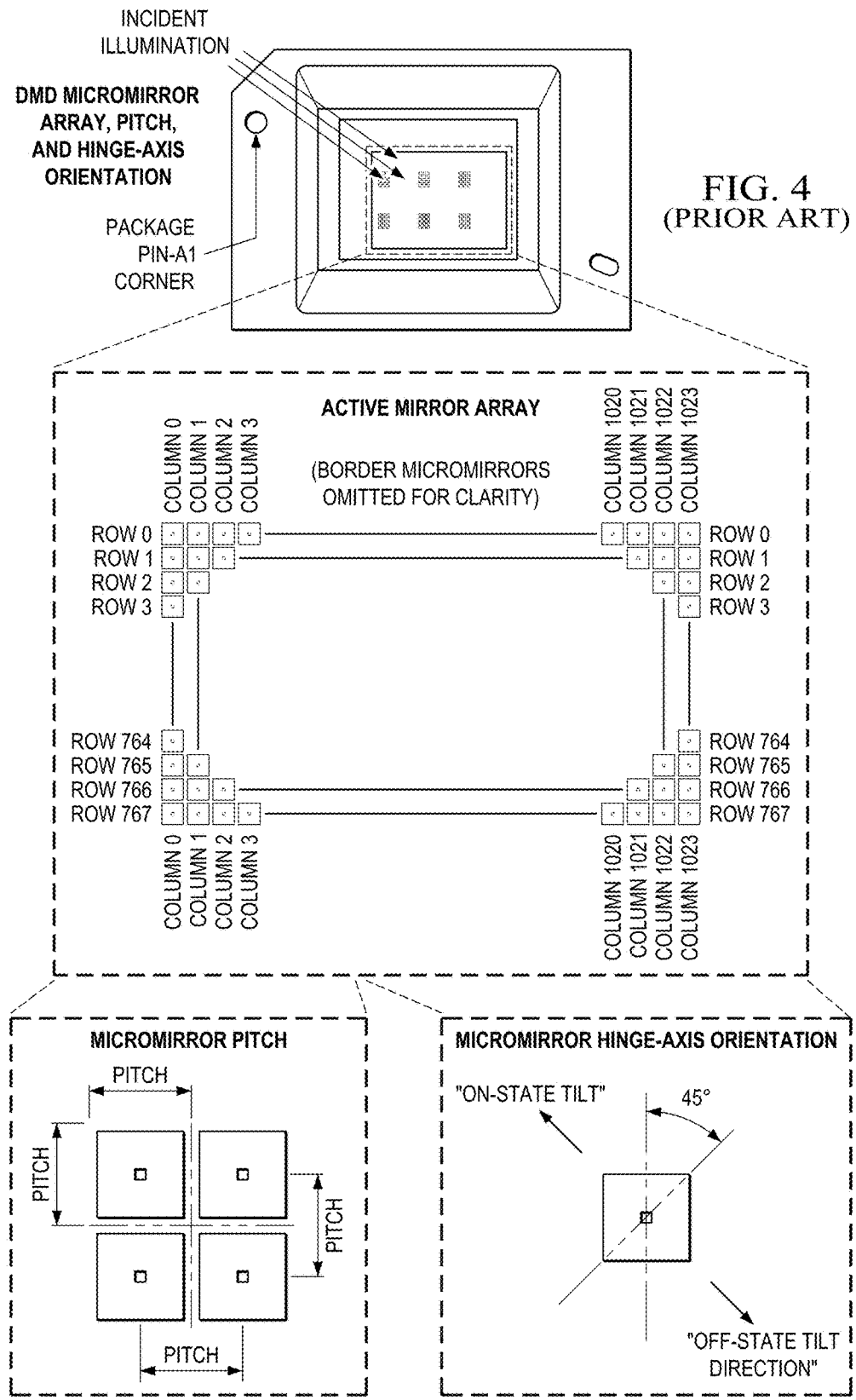
FIGS. 4-5 illustrate a conventional Manhattan-type configuration of micromirrors in a DMD device.
Figure 5:
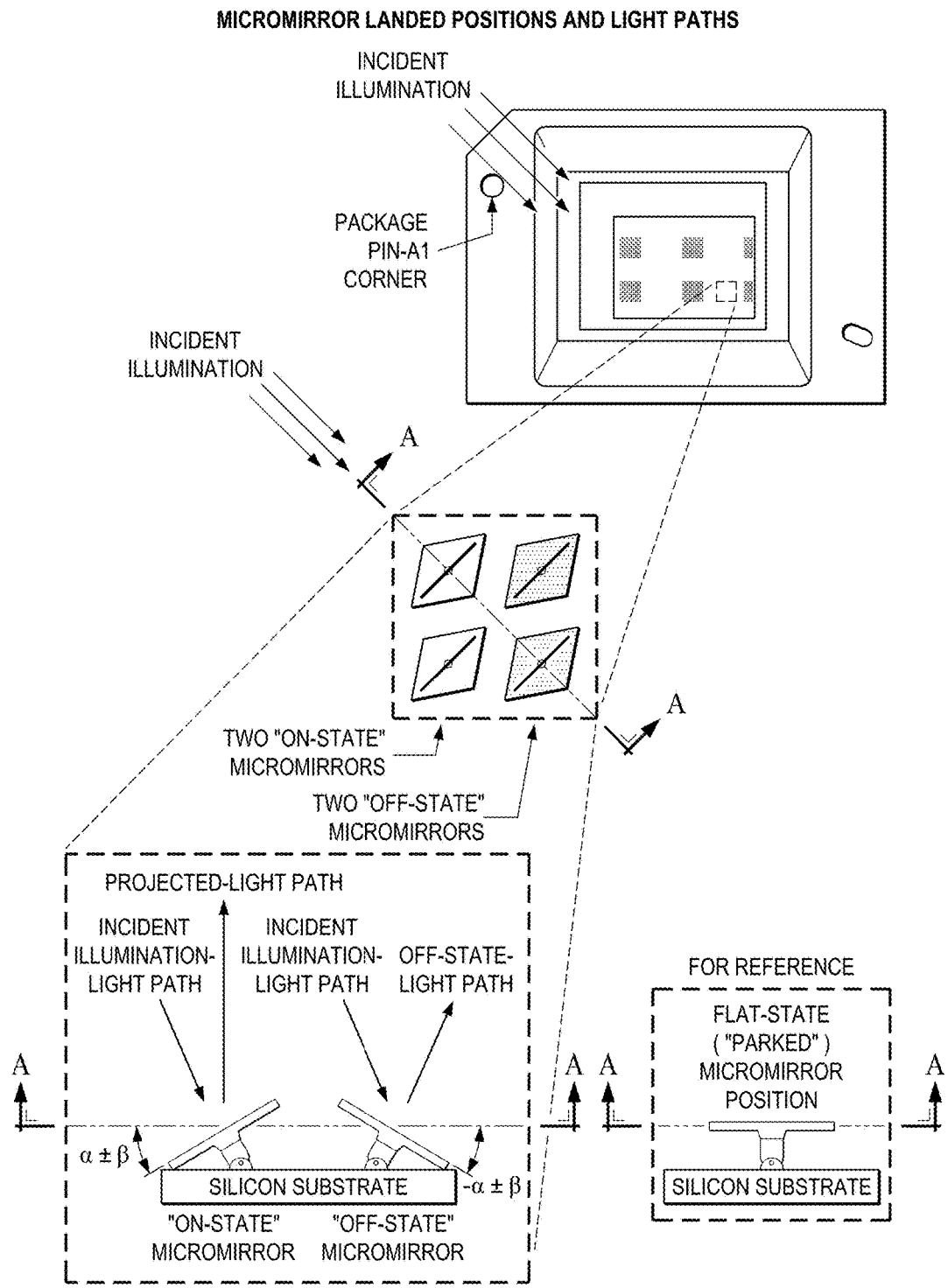
Figure 6:
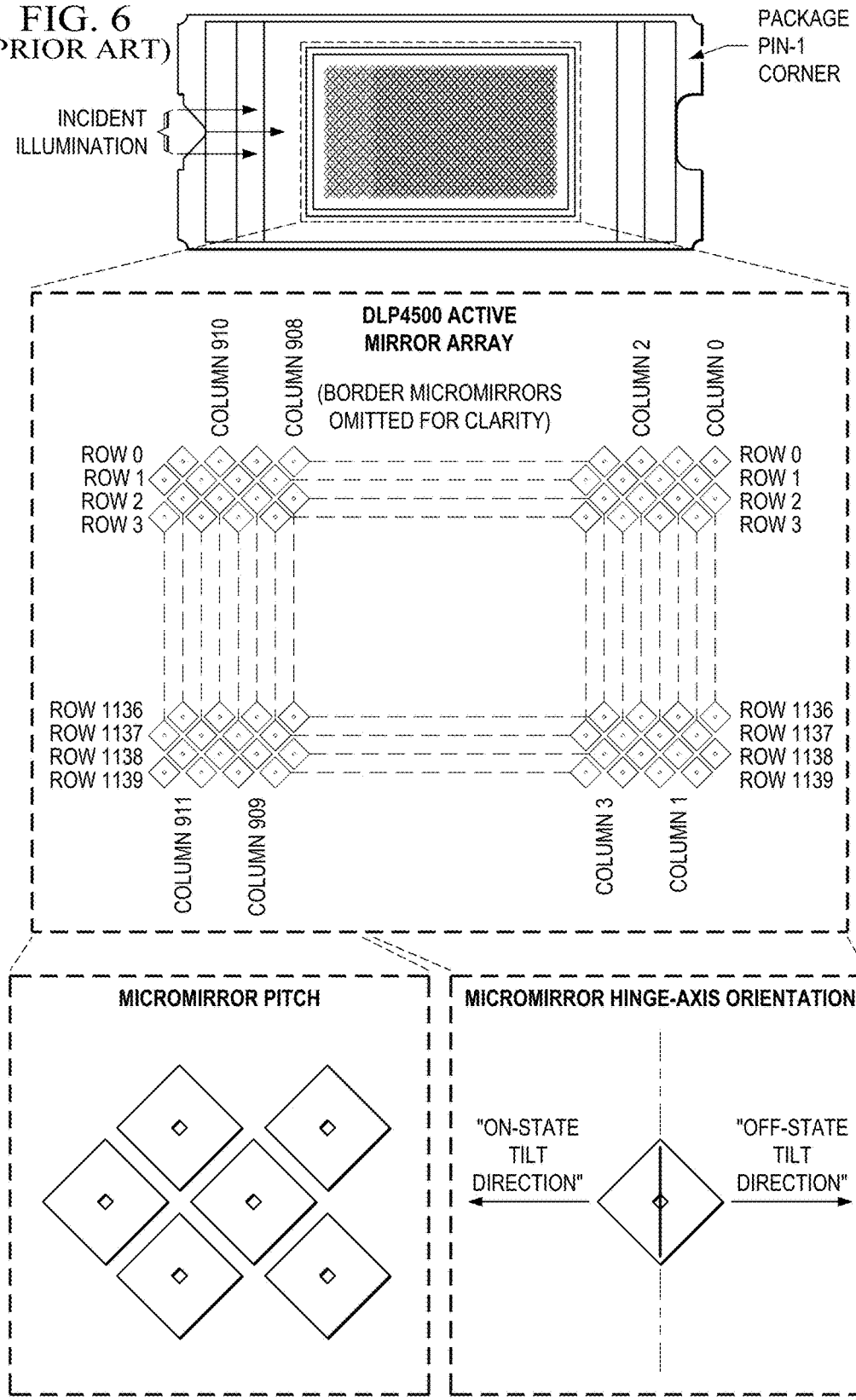
FIGS. 6-7 illustrate a diamond pixel configuration of micromirrors in a DMD device.
Figure 7:
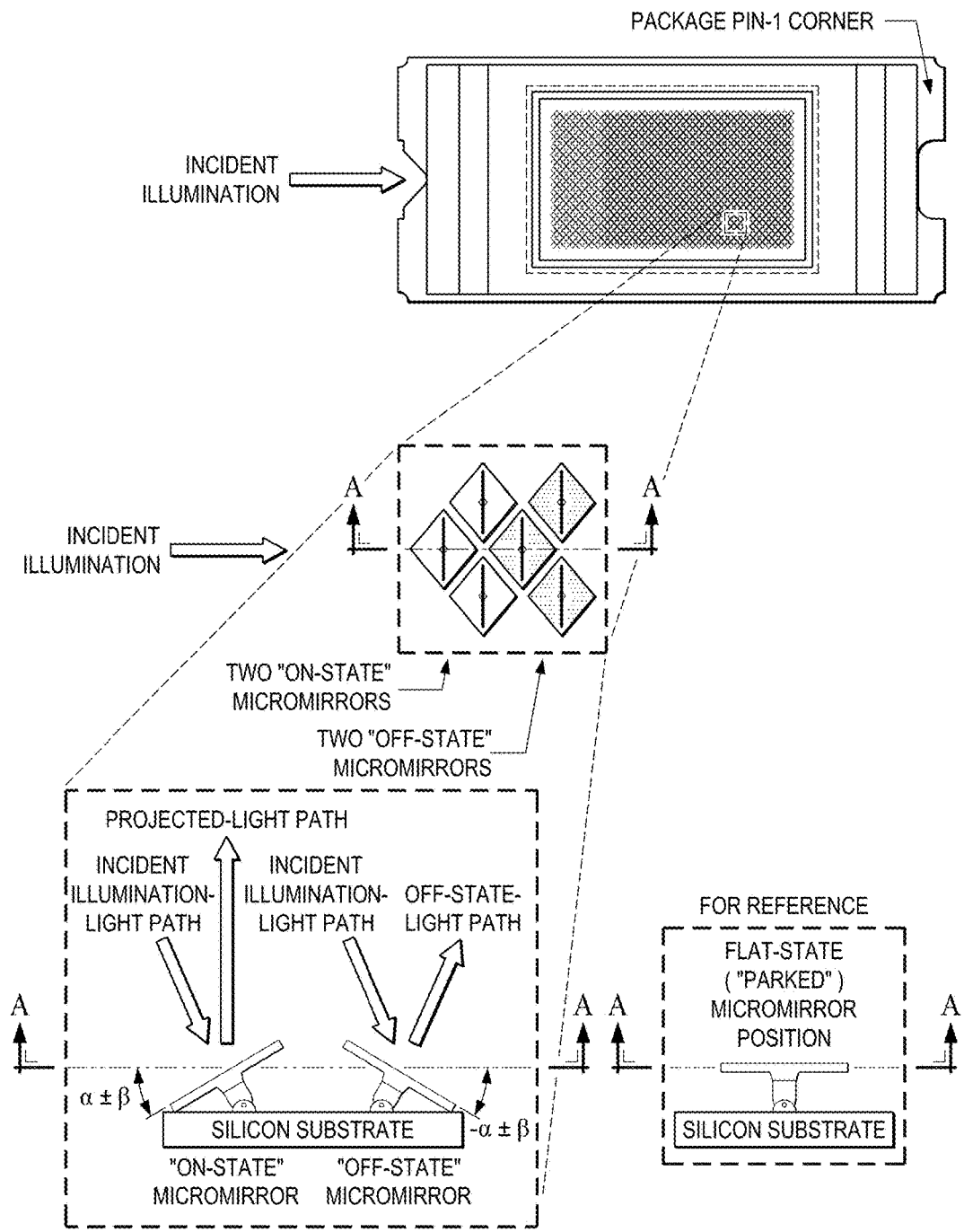
Figure 8:
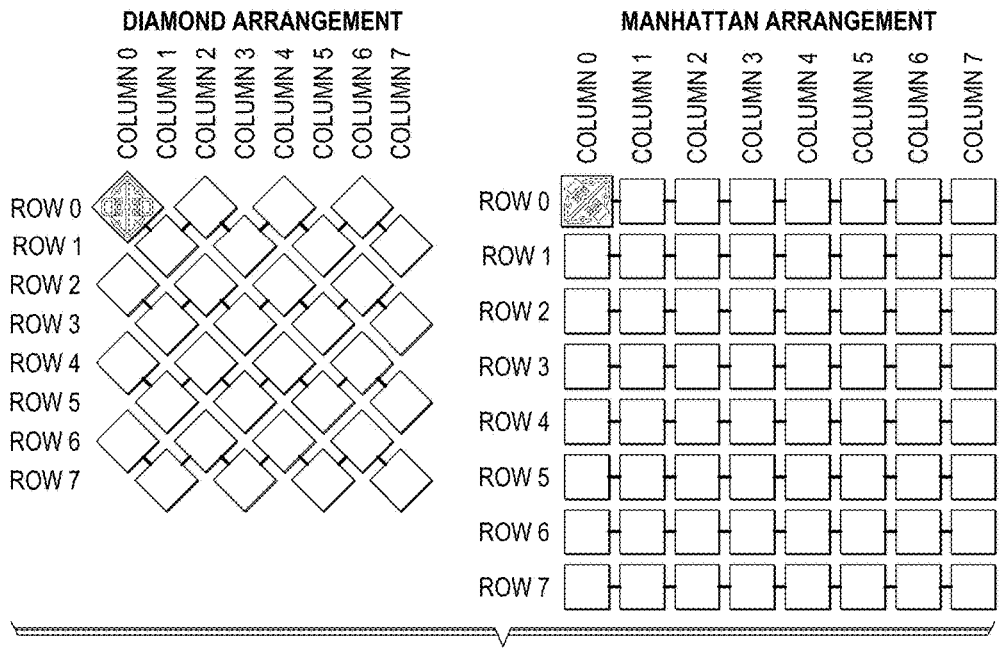
FIG. 8 illustrates a side-by-side comparison of the diamond and Manhattan arrangement.
Figure 9:
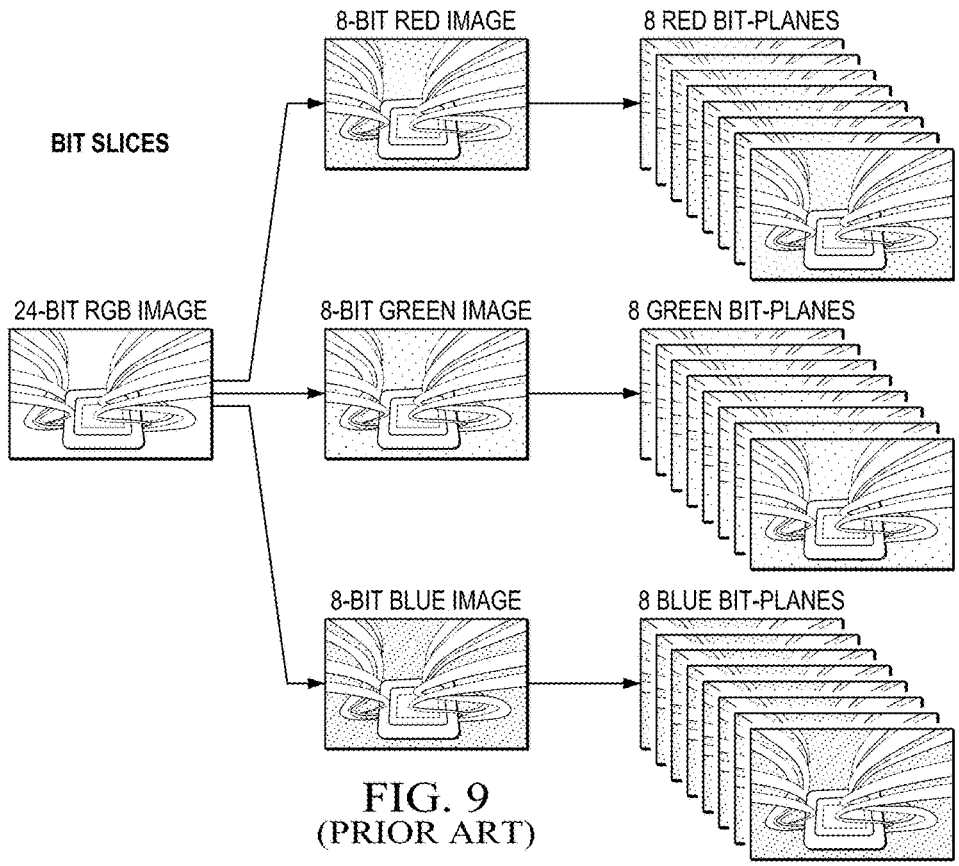
FIG. 9 illustrates a single video frame as composed of a series of bit-planes.
Figure 10:
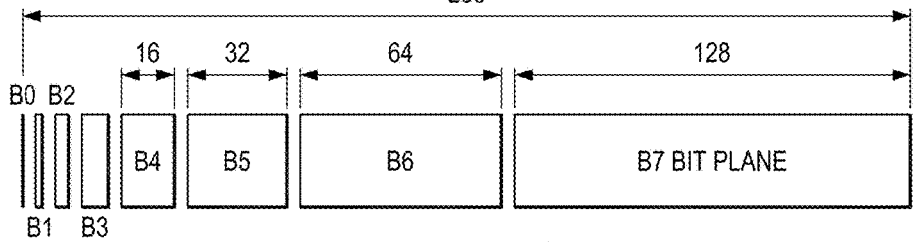
FIG. 10 illustrates the weighted illumination times for the bit-planes in a pulse-width modulation scheme employing simple binary weighting.
Figure 12:
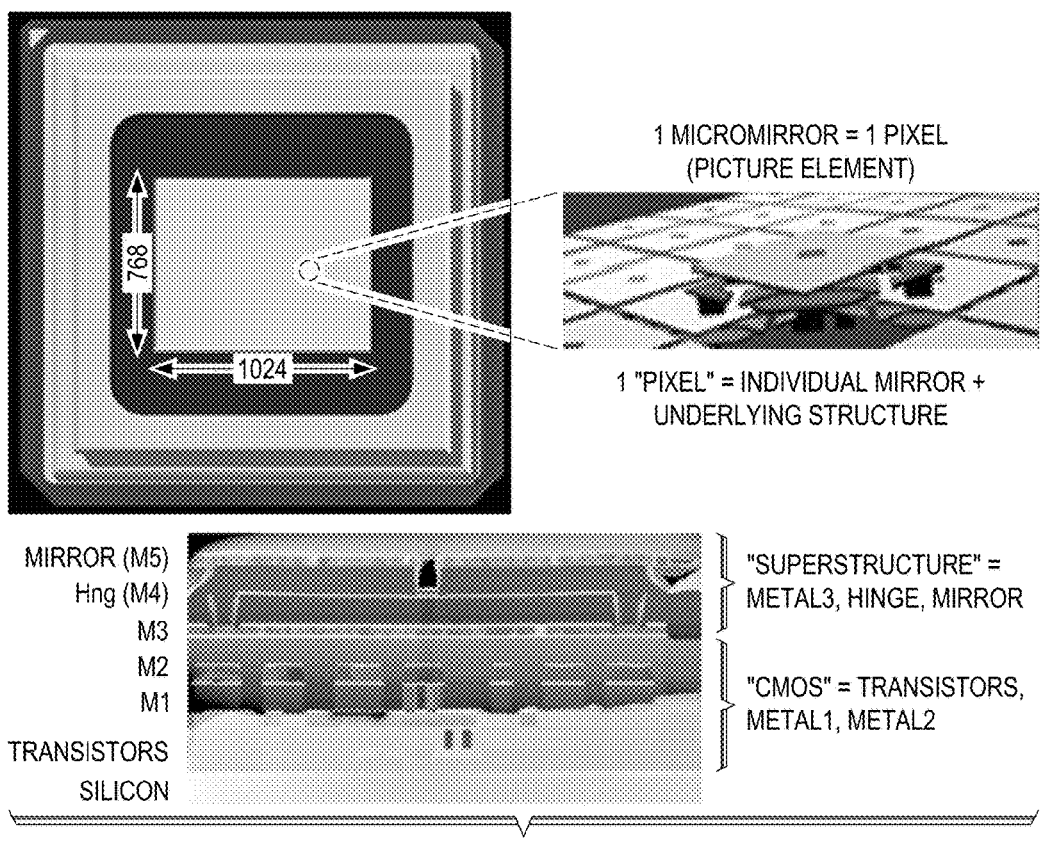
FIG. 12 shows a top view of a Texas Instruments DLP® DMD.
Figure 11:
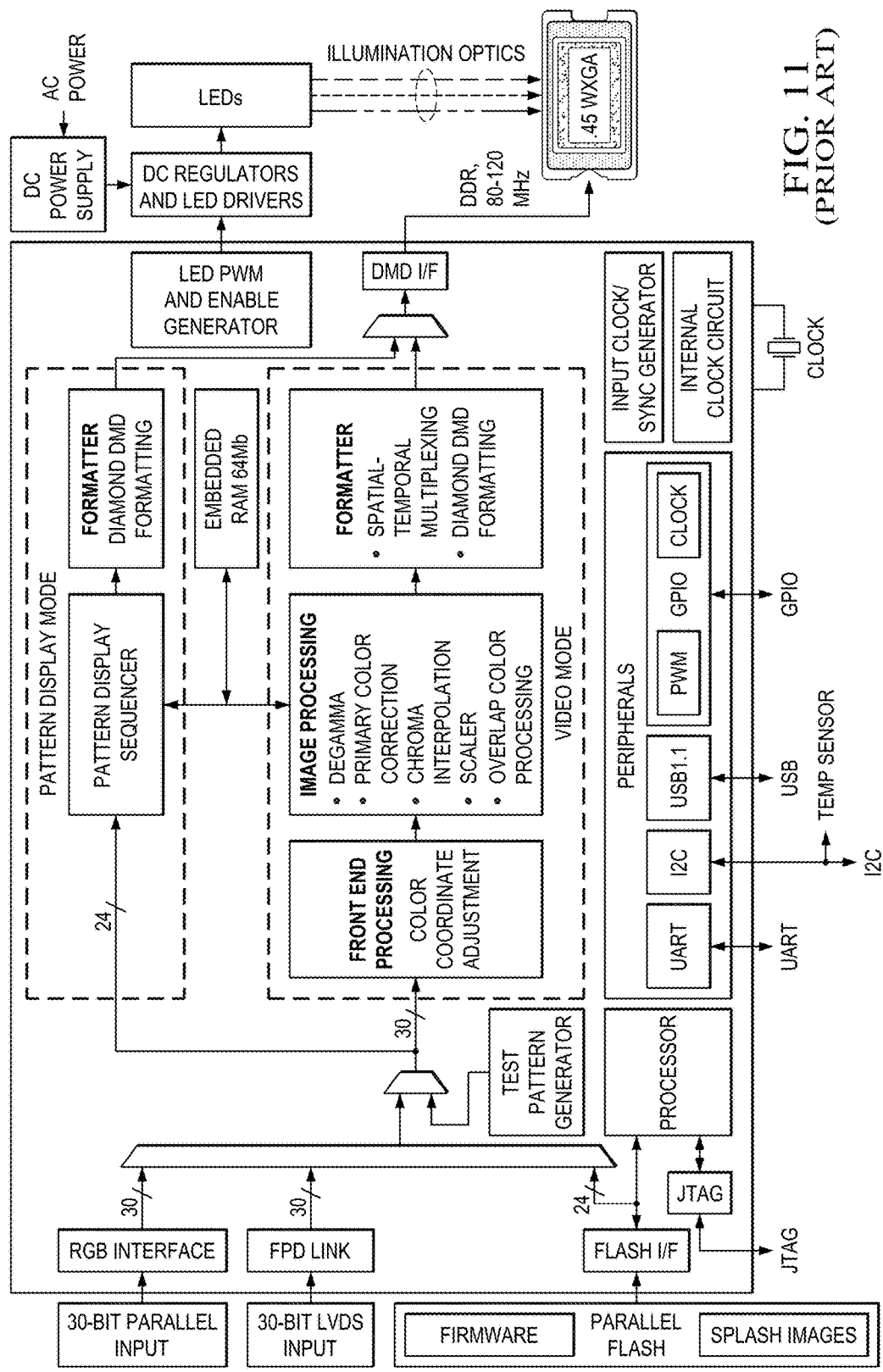
FIG. 11 is a functional block diagram of the Texas Instruments DLPC350 chip.
Figure 13:
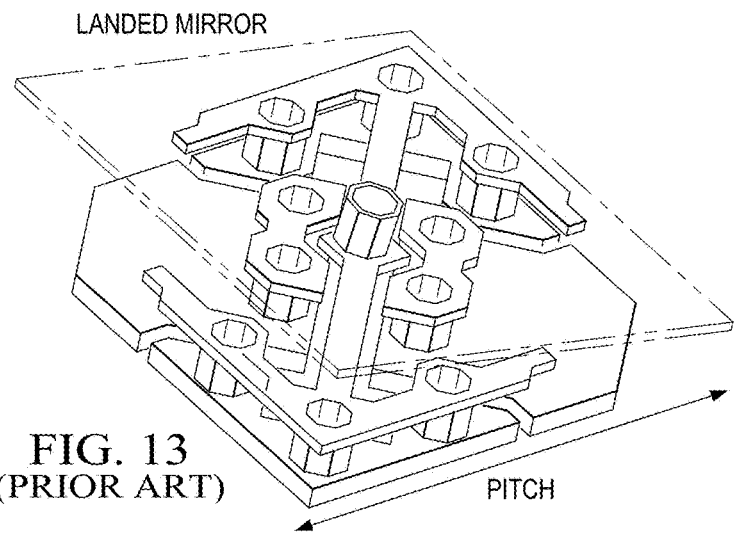
FIGS. 13-15 illustrate the assembled and released pixel structure of FIG. 3.
Figure 14:
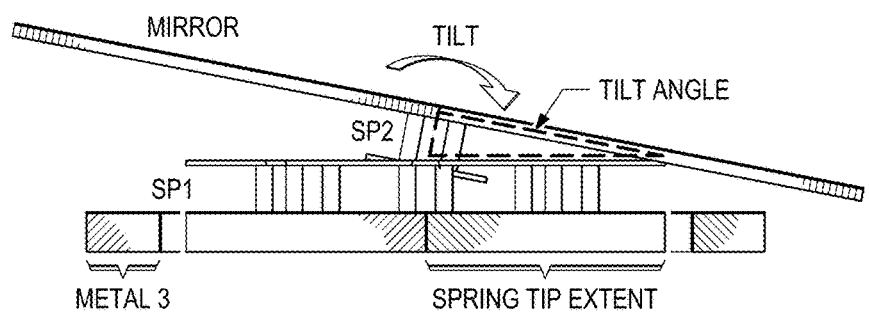
Figure 15:
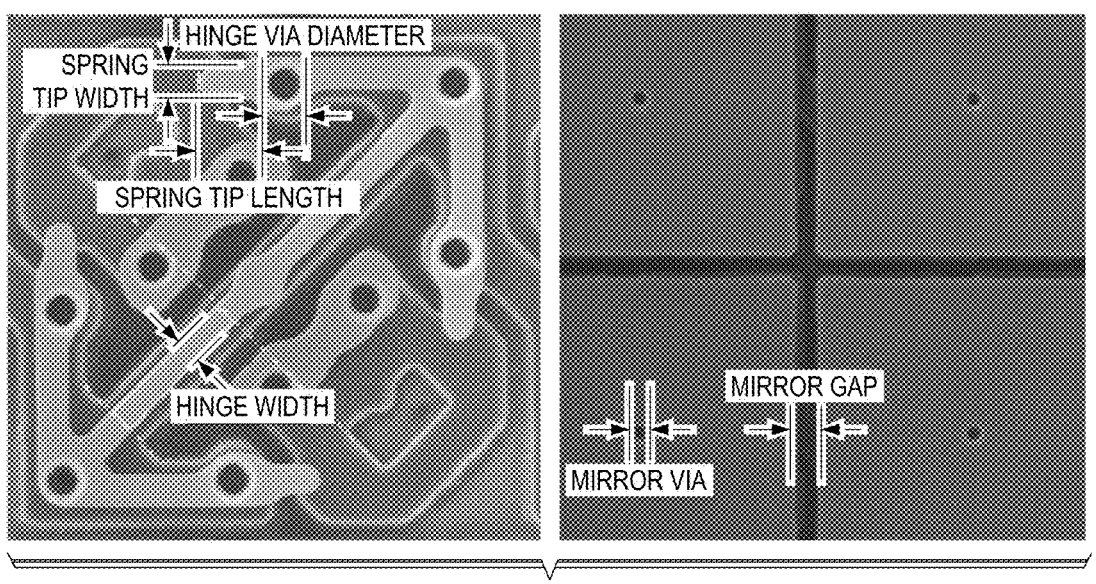
Figure 16:
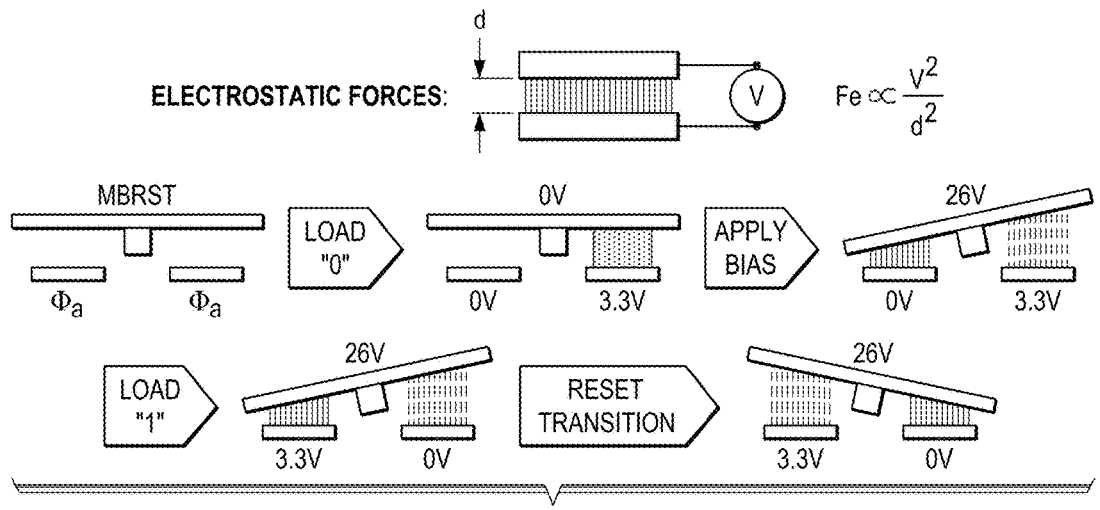
FIG. 16 is a schematic view of the mirror in various bias states.
Figure 17:
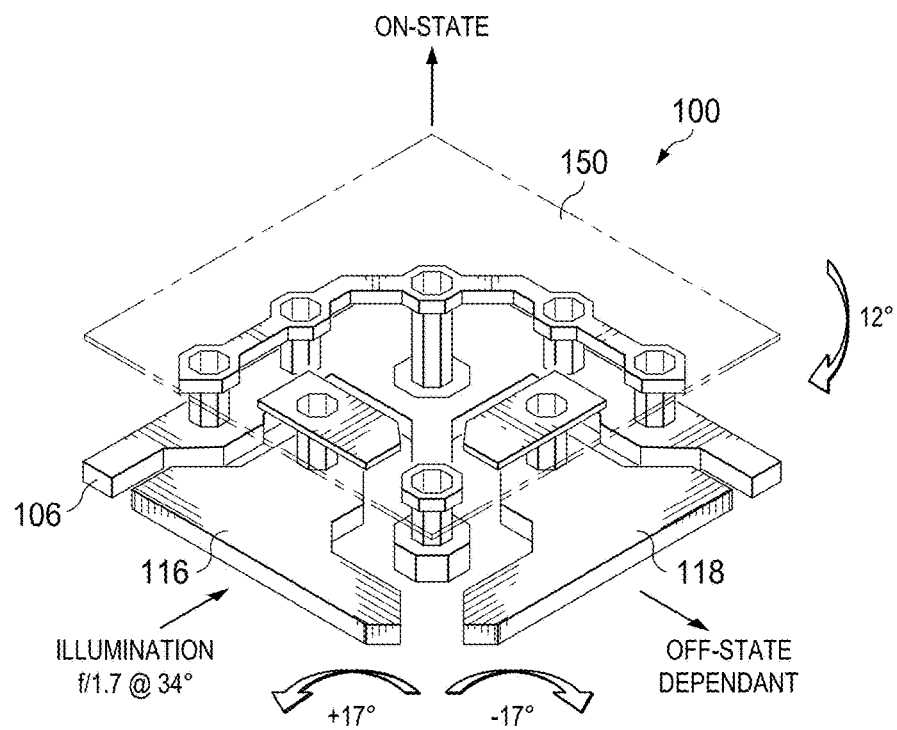
FIG. 17 is a three-dimensional view of a micromirror pixel element.
Figure 18:
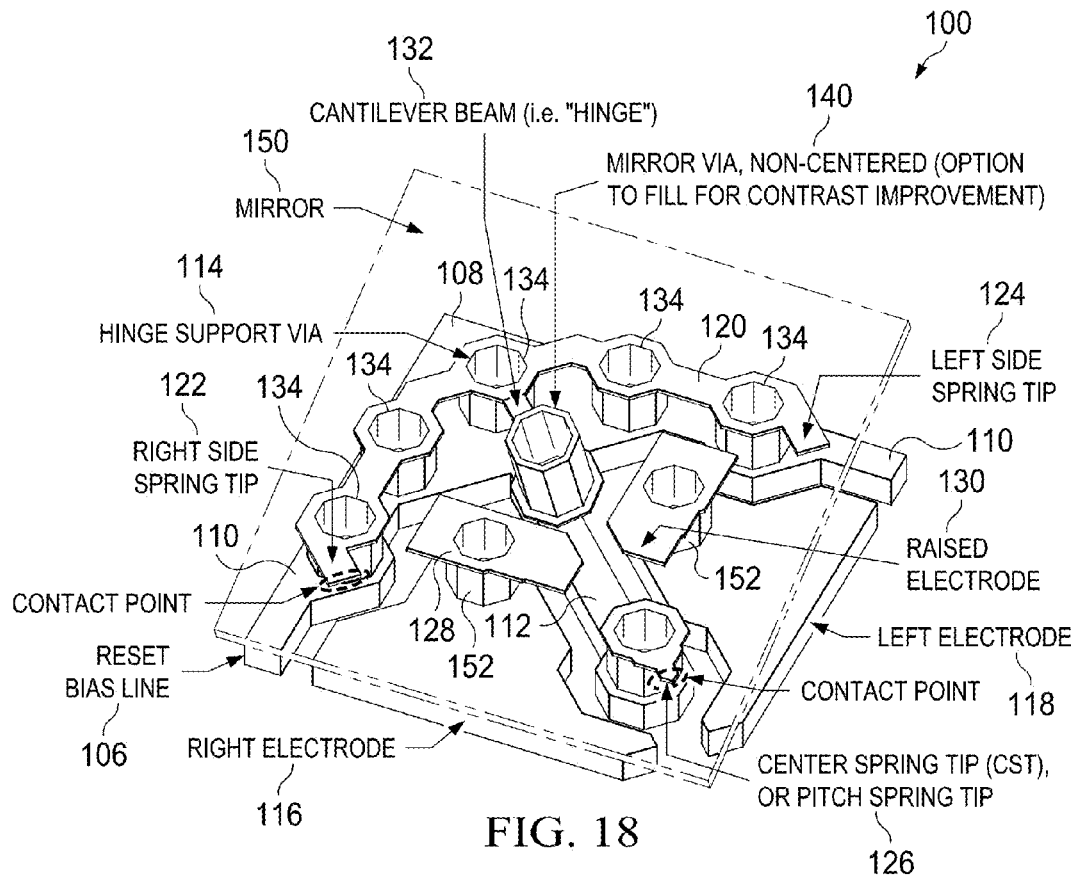
FIG. 18 is a three-dimensional view of the micromirror pixel element of FIG. 17 in a landed state.
Figure 19:
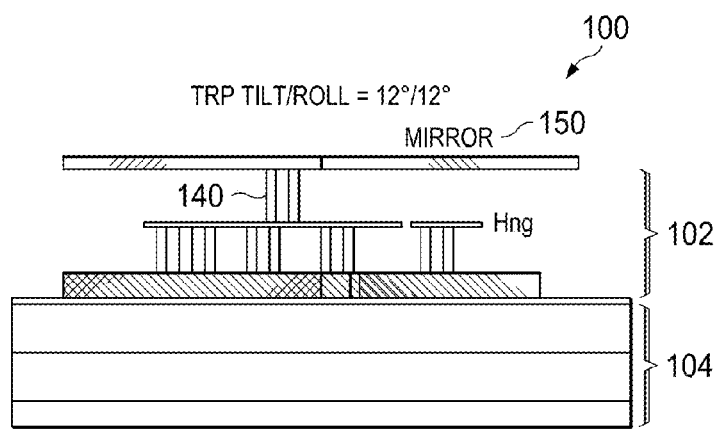
FIG. 19 is a side view of a micromirror pixel element.
Figure 20:
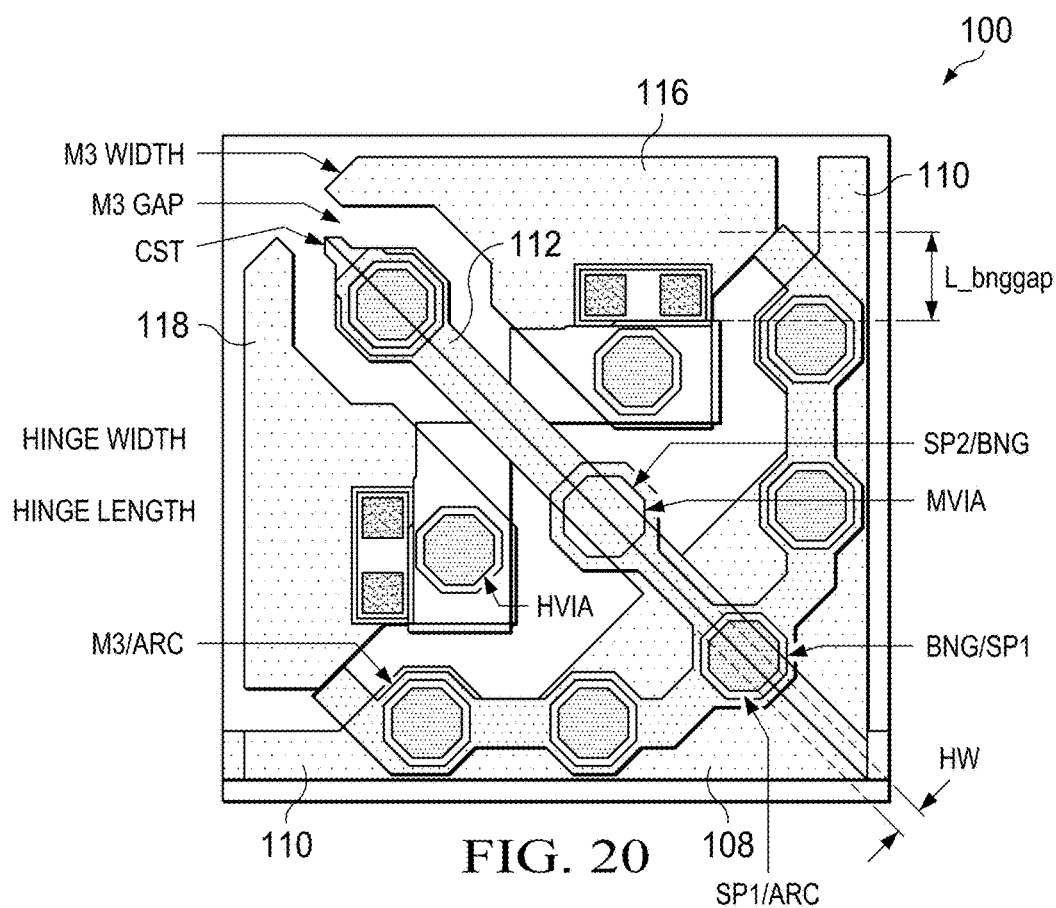
FIG. 20 is a top view of a micromirror pixel element.
Figure 21:
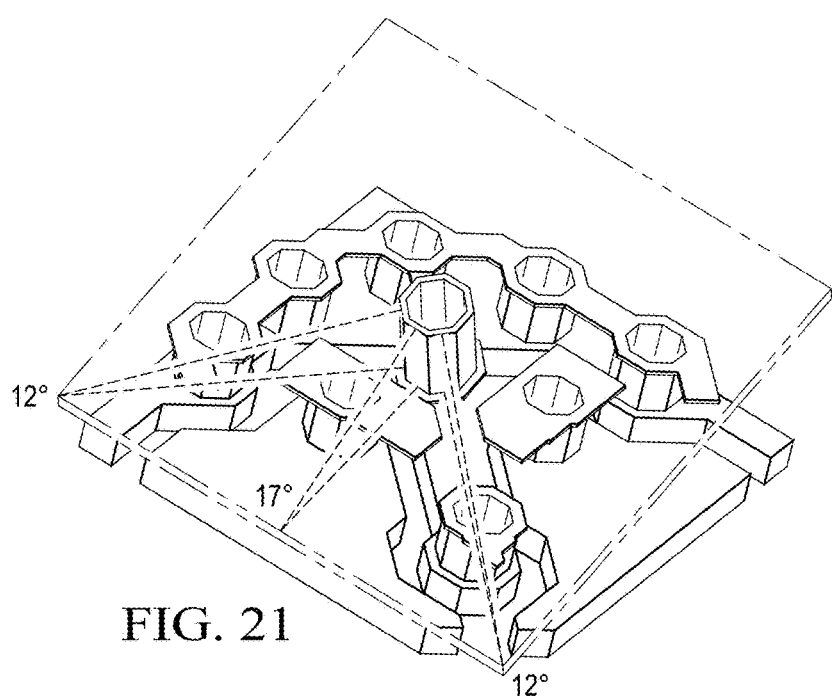
FIGS. 21-22 are three-dimensional views of a micromirror pixel element.
Figure 22:
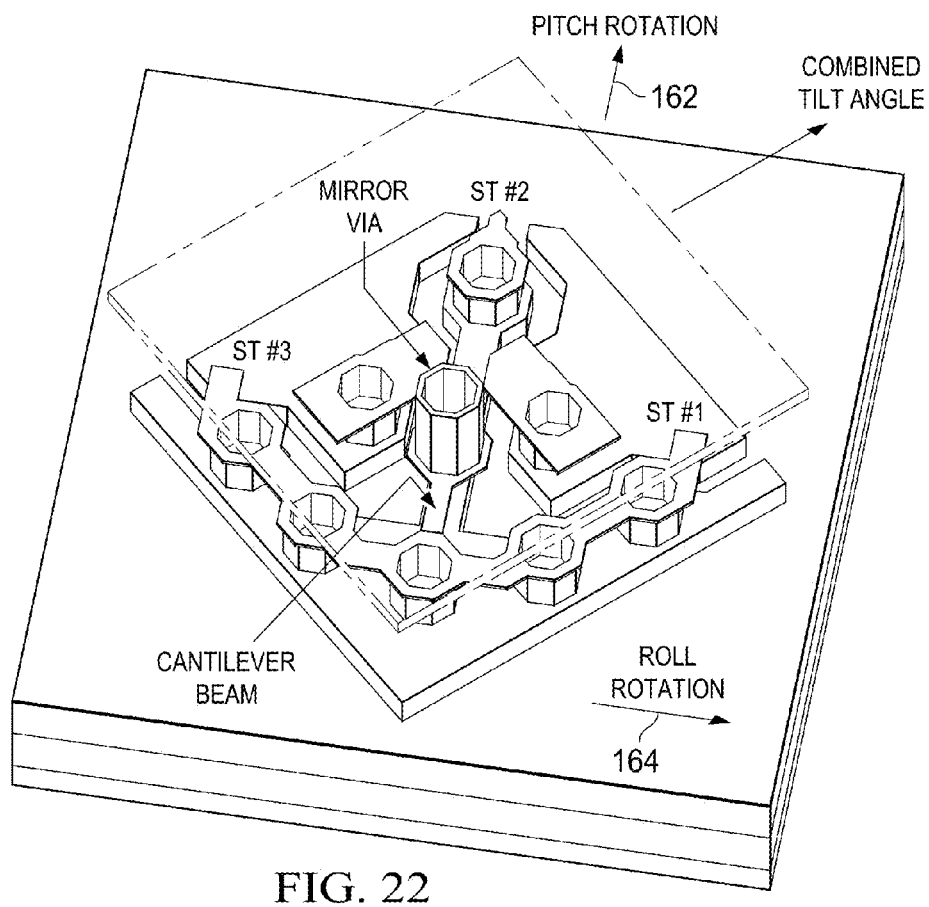

Contacts to the underlying CMOS circuitry, metal electrode address pads, and reset bias line elements are formed through deposition and patterning of a conductive layer (one or more layers of metal; Metal 3). As shown in FIGS. 18 and 20, the MEMS structure 100 is formed within a generally rectangular (viz., square) horizontal area, and an array of micromirrors may be placed in adjacent positions forming a Manhattan-type array. The reset bias line 106 assumes an anchor or cross-bow shape (as viewed from above) in the horizontal plane, including a pointed bulk section 108 occupying a corner of the rectangle and having an internal extent stretching diagonally across the rectangle from about midway of one side to midway of an adjacent side. Narrower elongations 110 extend out from the bulk section 108 to the next corner along each one of the respective adjacent sides, and another narrower elongation 112 extends centrally out from the bulk section along the diagonal of the rectangle from the corner occupied by the bulk to a position just short of the diagonally opposite corner. The side elongations 110 include widened portions along their lengths which serve as landing sites for hinge level spring support vias 114 to be formed later. The diagonal elongation 112 includes a widened portion to serve a similar purpose adjacent its distal end (end closest to the opposite corner). Right 116 and left 118 address electrodes are formed within the same plane, in the spaces between the side 110 and central 112 reset bias line extensions. An outer portion of each electrode is generally aligned with a respective side of the rectangle, not spanned by the reset bias line. An inner portion of each electrode is located proximate a respective side of a juncture of the reset bias line central extension 112 with the bulk section 108. The right 116 and left 118 electrodes are laterally spaced from the reset bias line 106, providing sufficient electrical isolation to enable the electrodes and bias line to reach different potentials.

A hinge (spring) 120 with right 122 and left 124 spring tip extensions, a central spring tip 126 along the diagonal, and right 128 and left 130 raised address electrodes are formed through deposition and patterning of a next conductive layer (FIG. 18). This can be accomplished by forming and patterning a first sacrificial layer (e.g., photoresist) over the previously patterned conductive layer that configures the reset bias line 106, right electrode 116 and left electrode 118. The first sacrificial layer patterning includes the formation of via openings. A layer of hinge forming material (one or more layers of metal; Metal 4) is then deposited over the patterned first sacrificial layer including conformally within the via openings. The deposited hinge layer is then patterned to define the lateral contours of the hinge, the central spring tip, and right and left raised electrodes. The defined hinge 120 has a truncated anchor or crossbow shape, with a generally arcuate contoured bulk section extending over the reset bias line bulk section 108 and at least partially over the right and left side extensions 110 of the reset bias line 106. The hinge 120 also has a cantilevered beam section 132 that extends centrally from the hinge bulk section diagonally in alignment above and for a portion of the length toward the opposite corner of the reset bias line central extension 112. The hinge bulk section is supported in contact above the reset bias line bulk section 108 by a hinge support via 114 proximate the corner occupied by the reset bias line bulk section 108, and one or more via supports 134 spaced along the adjacent sides. FIG. 18 illustrates an example implementation with the arcuate section supported by five support vias: one proximate the corner, one proximate each respective juncture of the inner part of the reset bias line bulk section 108 with the adjacent sides, and one over each widened portion of a respective right or left reset bias line side extension 110. The cantilevered beam section 132 is supported at its outer end by the corner hinge support via 114, but remains unsupported at its inner end. The inner end includes a widened area portion left suspended that serves as a landing site for a later formed mirror support via 140. Each extremity (furthest portion relative to the corner) of the arcuate section defines a spring tip that extends freely beyond a respective support via 134 over the widened portion of the respective underlying bias line side extension 110.

The patterning of the layer of hinge forming material also defines a third spring tip 126, and right 128 and left 130 raised electrodes. The third spring tip element is formed supported by a support via that joins the underlying widened landing site provided by the diagonally extending central elongation 112 of the bias line 106. It is laterally spaced from the widened portion of the hinge cantilever beam 132 by an amount sufficient to prevent non-interference with the flexure movement of the beam. An extreme end of the third spring tip element juts out from the associated via support toward the opposite corner (corner which the bias line central elongation stops short of) and defines a center spring tip (or pitch spring tip) 126. The center spring tip 126 and the two spring tips 122, 124 provided at the extremities of the hinge arcuate section serve as the three contact points for control of movement during operation of tilting and rolling of the pixel mirror 150. The right 128 and left 130 raised electrodes are formed respectively supported by support vias 152 over the inner portions of the underlying right 116 and left 118 electrodes. The support vias 152 provide conductive communication with the underlying electrodes, so that the potential at the raised electrodes can be selectively set via respective potentials established at the underlying electrodes. Likewise, the hinge beam potential is electrically communicated via its support vias for establishment of a same potential as the potential applied to the underlying bias line. The right and left raised electrodes and hinge elements are all spaced and sufficiently isolated to allow different potentials to be set independently for each of them.

A mirror 150 and support for the mirror are formed through deposition and patterning of a next conductive layer. This can be accomplished by forming and patterning a second sacrificial layer (e.g., photoresist) over the previously patterned hinge forming material layer that defines the cantilever hinge, spring tip and raised electrode elements. The second sacrificial layer is patterned to include a central via opening (shown as non-centered relative to the rectangle but in other embodiments might be centered) over the free end landing site defined by the widened portion of the cantilever beam 132. A layer of mirror forming material (one or more layers of metal; Metal 5) is formed over the patterned second sacrificial layer, and patterned to form a reflective element (in the example, a rectangular-shaped mirror). The mirror forming material extends into the central via opening to define a support for the mirror (mirror via 140). To provide flatness, the upper surface of the second sacrificial layer may be planarized prior to deposition of the mirror forming material. The first and second sacrificial layers provide support to the hinge and mirror forming layers during fabrication and are subsequently removed (viz., dry etched) to release ("free") the hinge and mirror following formation.

Figure 26:
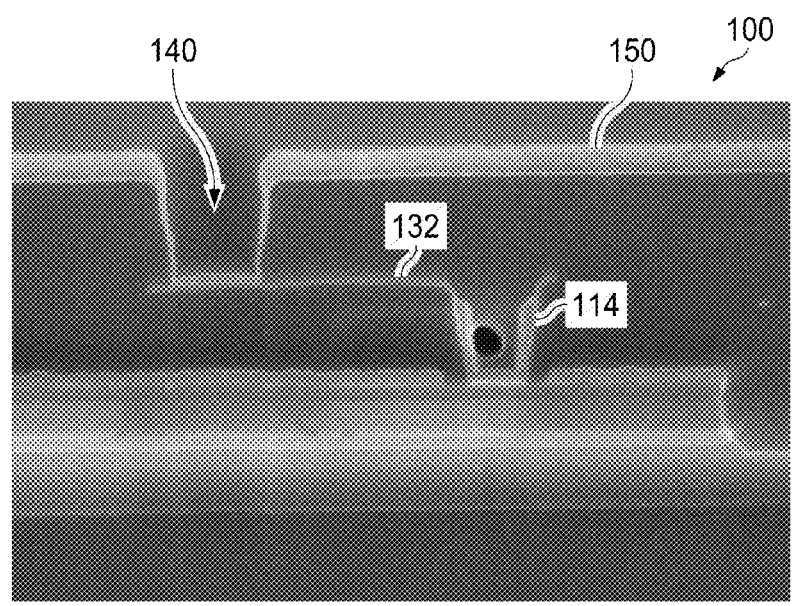
FIG. 26 is a cross-sectional view showing the structure of FIG. 18 on a section passing through the diagonal of the rectangle, in line with the longitudinal axis of the cantilever beam.

FIG. 26 is a cross-sectional view showing the structure 100 of FIG. 18 on a section passing through the diagonal of the rectangle, in line with the longitudinal axis of the cantilever beam 132. FIG. 26 illustrates the hinge support via 114 (right lower smaller via) proximate the corner of the rectangle supporting the hinge cantilever beam 132, and the mirror 150 supported by the mirror via 140 (left upper larger via) above the free end of the beam.

Figure 23:
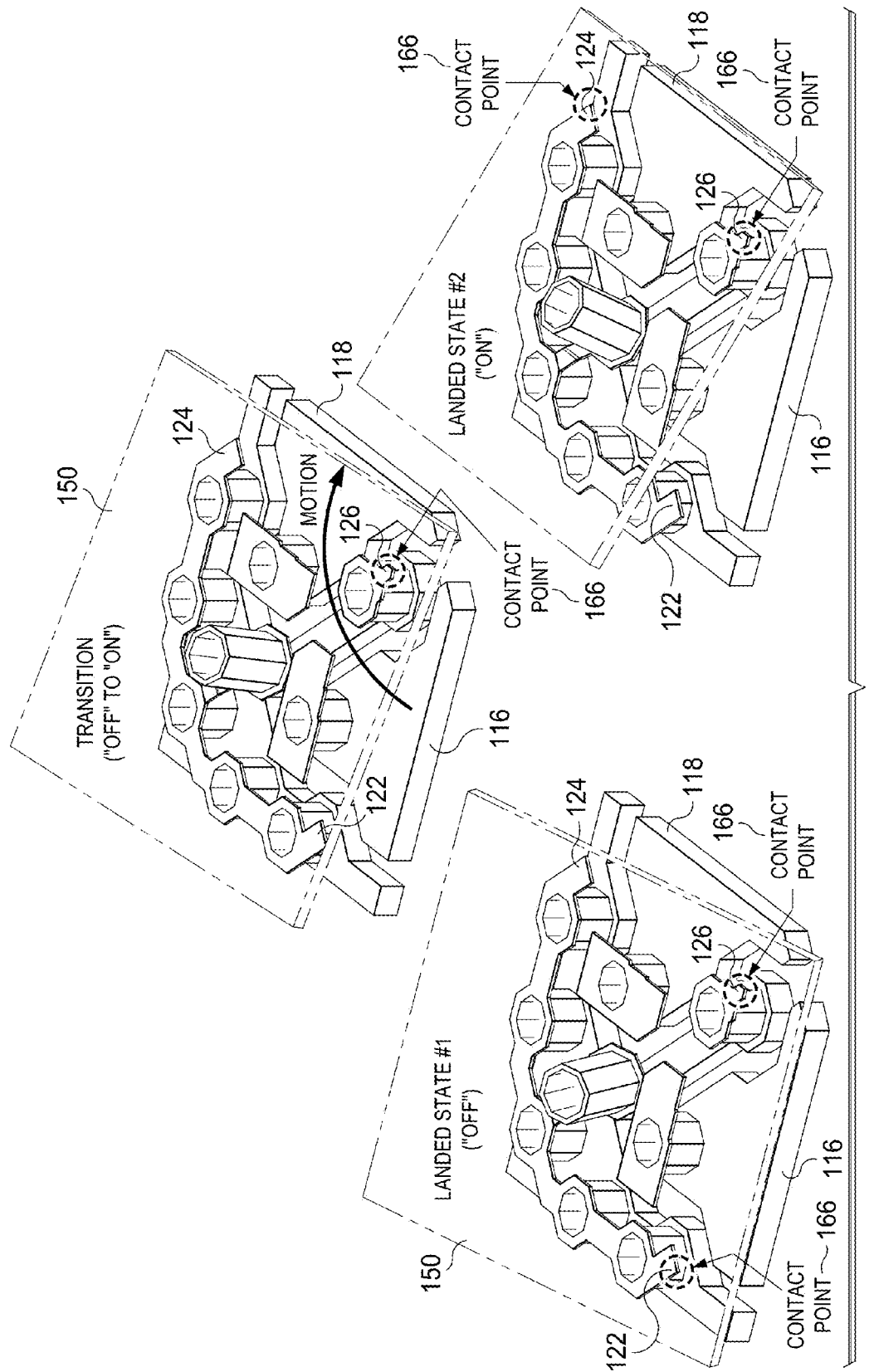
FIG. 23 illustrates end and intermediate orientations of the mirror.
Figure 24:
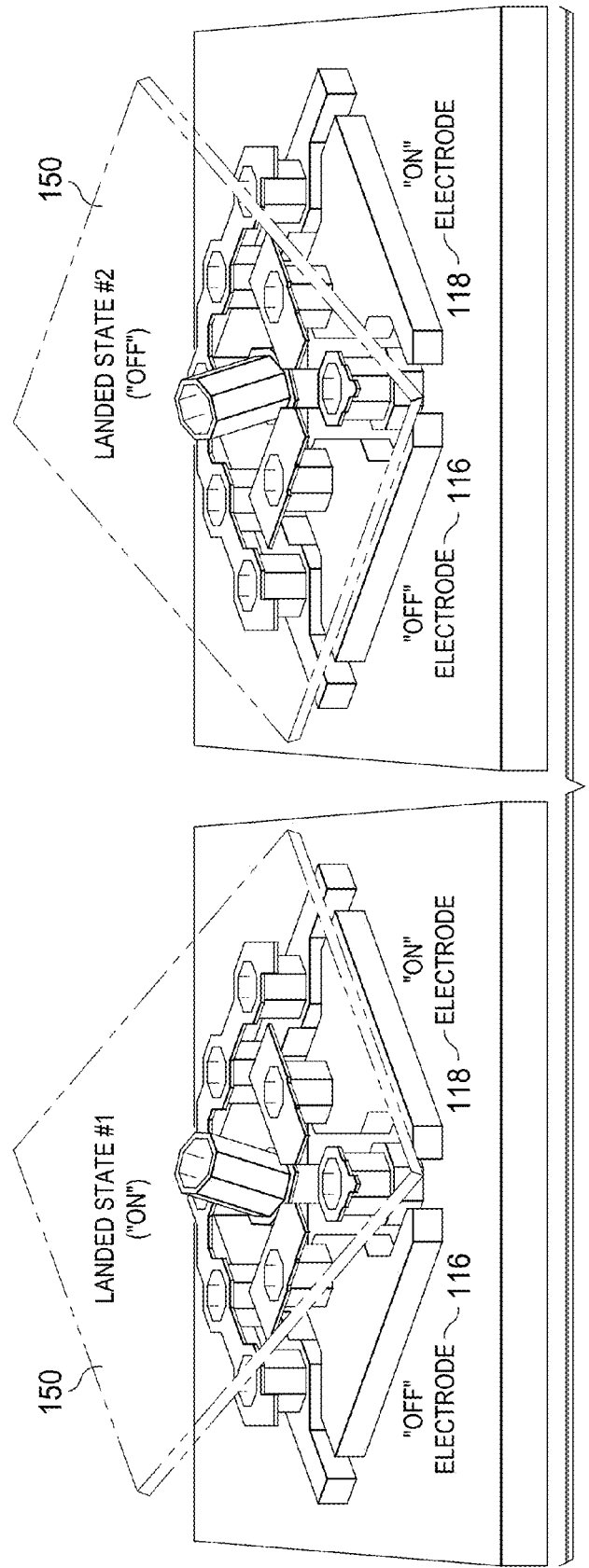
FIGS. 24-25 are three-dimensional views of the micromirror pixel element in the "on" and "off" states.
Figure 25:
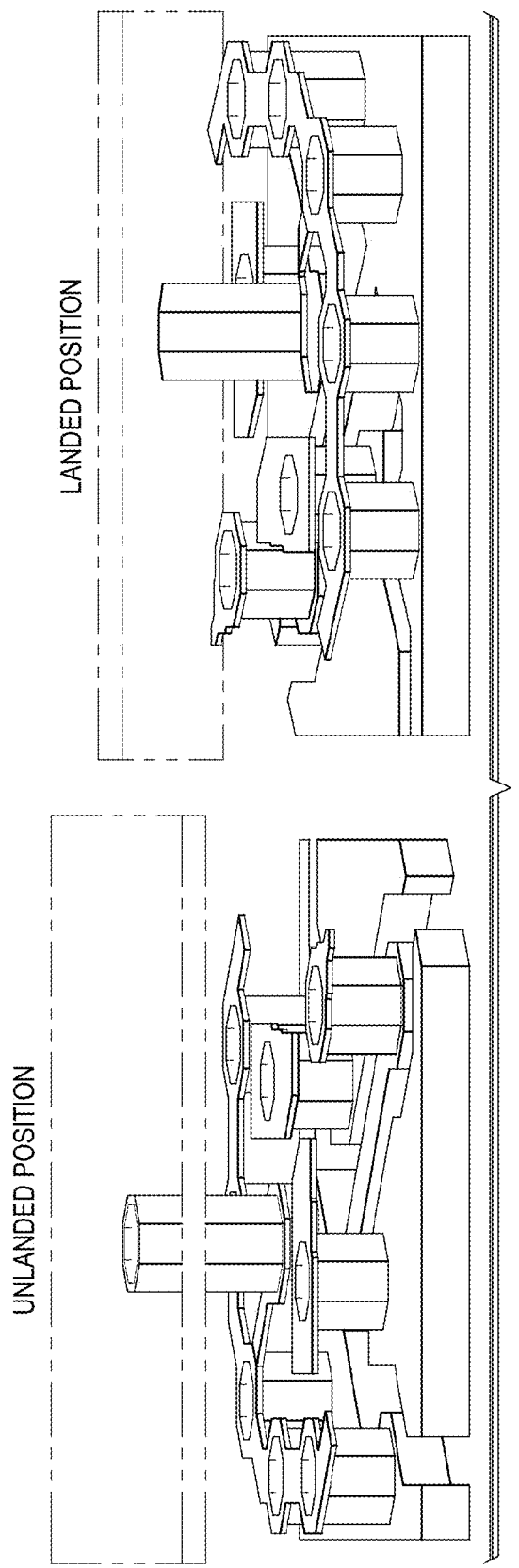

In operation, the mirror 150 undergoes pitch 162 and roll 164 rotations in movement between "ON" and "OFF" positions, responsive to selective application of activation bias and electrode voltage potentials to the reset bias line 106 and to the right 116 and left 118 electrodes. FIG. 23 illustrates end and intermediate orientations of the mirror in the tilting and rolling motion between a first ("OFF") landed state (also shown in FIGS. 18 and 21) and a second ("ON") landed state. As shown, in the first landed state ("OFF" position shown in left view in FIG. 23) the mirror 150 is tilted down and toward the right electrode 116, with an underside of the mirror resting on contact points 166 provided by the right side 122 and center 126 spring tips. In the intermediate position, the mirror is lifted up and rolled (in the direction of the arrow in the intermediate position shown in the middle view in FIG. 23) away from the right electrode 116 and over toward the left electrode 118. Then, in the second landed state ("ON" position shown in the right view in FIG. 23) the mirror is tilted down and toward the left electrode 118, with an underside of the mirror resting on contact points 166 provided by the left side 124 and center 126 spring tips. The landed and unlanded positions are illustrated also in FIGS. 24 and 25.

Figure 27:
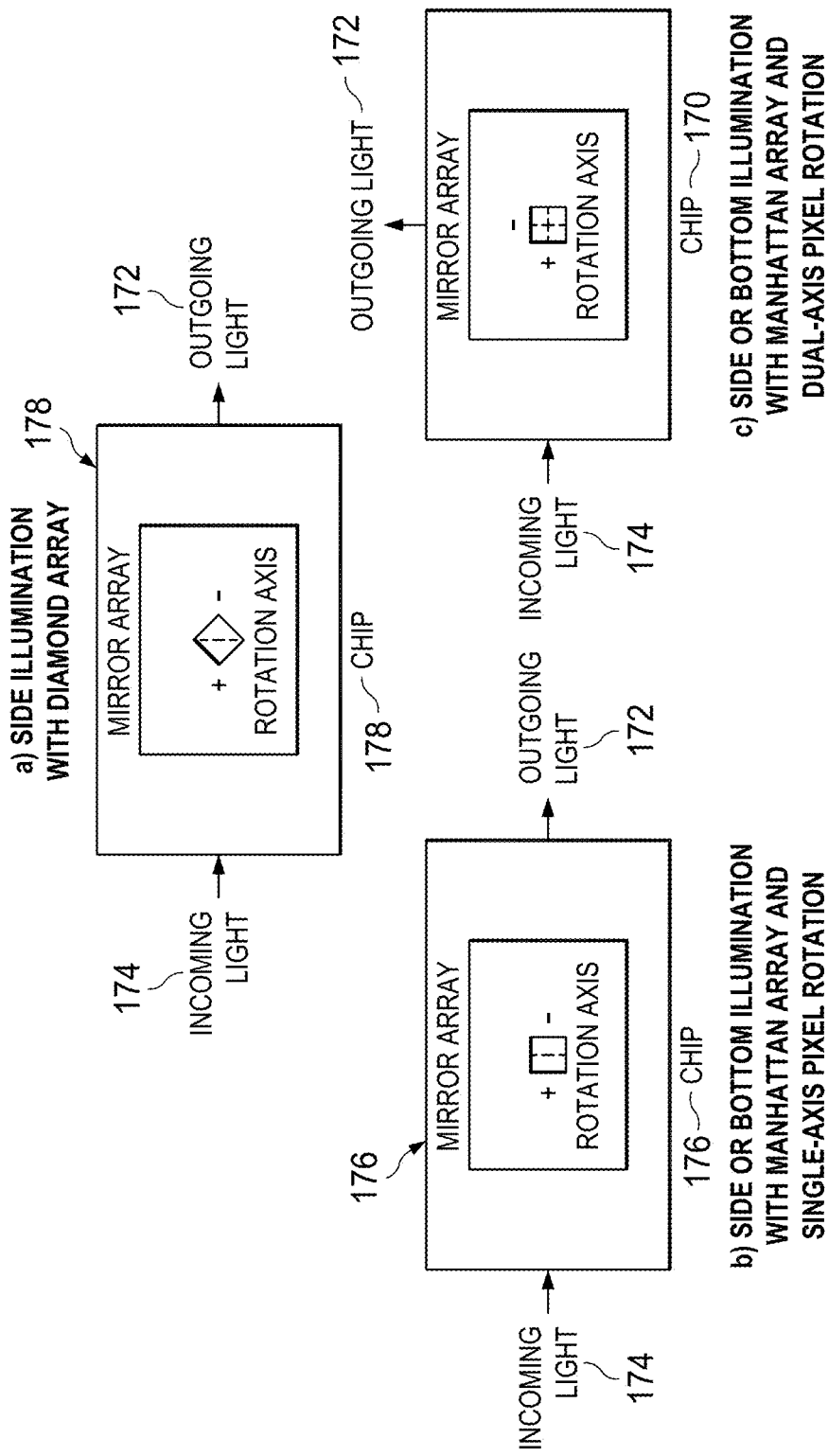
FIG. 27 illustrates the illumination path for the diamond array single axis, Manhattan array single axis; and the Manhattan array dual axis approaches.

In departure from conventional mirrors, it will be observed with reference to FIG. 27, that the combined tilt and roll action of the novel architecture involves a rotation about two axes, not just one axis, with the mirror moving from a first landed state with one edge tilted down to a second landed state with an adjacent edge, not an opposite edge, tilted down. Thus, with the new mirror, the outgoing light 172 for mirrors arranged on a chip 170 in a Manhattan-type array can be directed off a second side of the pixel at 90 deg. to a first side of the pixel to which the incoming light 174 is directed, as shown in the bottom right view in FIG. 27. This differs significantly from the previously described conventional single axis tilting (only) mirrors arranged in either the Manhattan-type 176 or diamond array 178, for which the outgoing light 172 is directed in the same direction as the incoming light 174, as shown in the top and bottom left views in FIG. 27.

Figure 28:
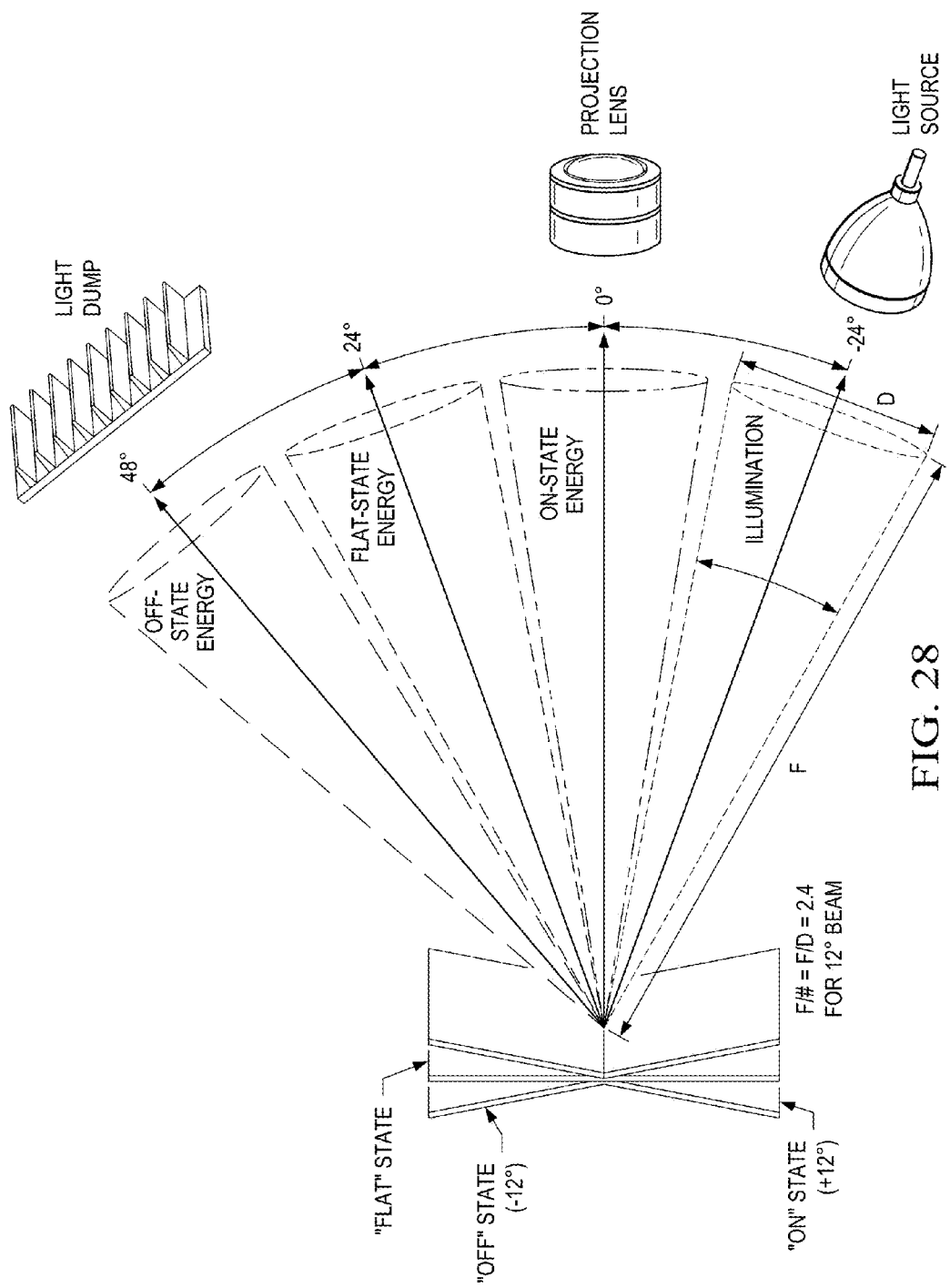
FIG. 28 is a schematic of the optical path for a micromirror pixel.
Figure 29:
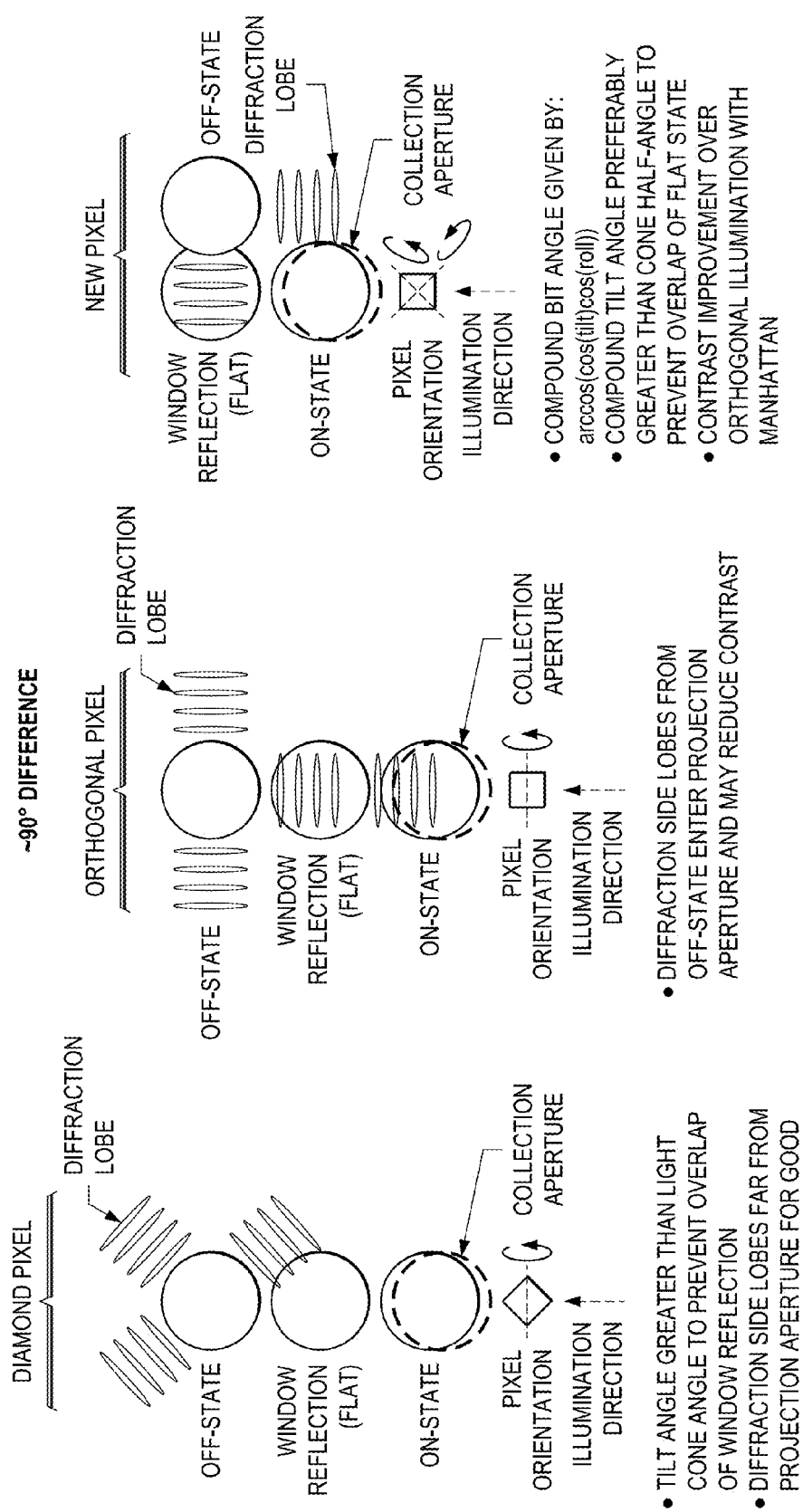
FIG. 29 is a top view of the optical path for various pixels.

The new structure also offers advantages of increased contrast and reduced "OFF"-state light interference as can be seen in the different light states illustrated in FIGS. 28 and 29.

Modifications are possible in the described embodiments, and other embodiments are possible, within the scope of the claims.

What is claimed is:
1. A digital micromirror device (DMD) pixel comprising:
  a first electrode located on a first side of the pixel, the first side having at least: a first end adjacent to a second side of the pixel; and a second end adjacent to a third side of the pixel;

a second electrode located on the second side of the pixel, the second side having at least:

a first end adjacent to the first side of the pixel; and a second end adjacent to a fourth side of the pixel;

a first spring tip located nearer to a corner of the pixel between the first and second sides than to other corners of the pixel;

a second spring tip located nearer to a corner of the pixel between the first and third sides than to the other corners of the pixel;

a third spring tip located nearer to a corner of the pixel between the second and fourth sides than to the other corners of the pixel;

a hinge supporting a micromirror, such that: in a first stable landed position, the micromirror rests upon the first and second spring tips, but not upon the third spring tip; and, in a second stable landed position, the micromirror rests upon the first and third spring tips, but not upon the second spring tip.

2. The DMD pixel of claim 1, wherein the first stable landed position and the second stable landed position are at least 90° apart.

3. The DMD pixel of claim 1, wherein the hinge is configured to tilt the micromirror on at least two axes of translation including a pitch translation and a roll translation.

4. The DMD pixel of claim 1, further comprising a bias line having: a bias line bulk section extending along at least a portion of the third side of the pixel and continuing along at least a portion of the fourth side of the pixel; and a bias line diagonal section extending diagonally across the pixel from the bias line bulk section to a location nearer to the corner of the pixel between the first and second sides than to the other corners of the pixel, wherein the hinge is located over the bias line.

5. The DMD pixel of claim 1, wherein the first electrode includes a first raised portion disposed inwardly of the first side, and the second electrode includes a second raised portion disposed inwardly of the second side.

6. A digital micromirror device (DMD) pixel comprising:

a right electrode located on a first side of the pixel, the first side having at least: a first end adjacent to a second side of the pixel; and a second end adjacent to a third side of the pixel;

a left electrode located on the second side of the pixel, the second side having at least: a first end adjacent to the first side of the pixel; and a second end adjacent to a fourth side of the pixel;

a bias line having: a bias line bulk section extending along at least a portion of the third side of the pixel and continuing along at least a portion of the fourth side of the pixel; and a bias line diagonal section extending diagonally across the pixel from the bias line bulk section to a location nearer to a corner of the pixel between the first and second sides than to other corners of the pixel;

a hinge located over the bias line, the hinge having: a right spring tip nearer to a corner of the pixel between the first and third sides than to the other corners of the pixel; a left spring tip nearer to a corner of the pixel between the second and fourth sides than to the other corners of the pixel; a center spring tip nearer to the corner of the pixel between the first and second sides than to the other corners of the pixel; a hinge bulk section over at least a portion of the bias line bulk section; and a cantilever beam section extending diagonally across the pixel from the hinge bulk section and continuing over at least a portion of the bias line diagonal section;

a micromirror supported on the hinge, the hinge being configured to tilt the micromirror on at least two axes of translation including a pitch translation and a roll translation.

7. The DMD pixel of claim 6, wherein the micromirror is configured to have: a first stable landed position resting upon the right spring tip and the center spring tip, but not upon the left spring tip; and a second stable landed position resting upon the left spring tip and the center spring tip, but not upon the right spring tip.

8. A method of operating a digital micromirror device (DMD) pixel, the method comprising:

placing a micromirror of the pixel in a first stable landed position using at least a pitch translation and a roll translation, such that the micromirror rests upon a first spring tip and a second spring tip, but not upon a third spring tip; and placing the micromirror of the pixel in a second stable landed position, such that the micromirror rotates to rest upon the third spring tip while continuing to rest upon the second spring tip but while ceasing to rest upon the first spring tip.

9. The method of claim 8, wherein the micromirror is tilted towards a first electrode on a first side of the pixel in the first stable landed position, and wherein the micromirror is tilted towards a second electrode on a second side of the pixel in the second stable landed position, wherein the first side and the second side are adjacent sides of the pixel.

10. The method of claim 8, wherein the first stable landed position and the second stable landed position are at least 90° apart.

11. The method of claim 8, further comprising:

directing an incoming light toward the pixel from a first side of the pixel, such that an outgoing light is directed off a second side of the pixel, the second side being at least 90° from the first side.

12. The method of claim 11, wherein a diffraction lobe of the first stable landed position does not overlap a projection aperture.

* * * * *